United States Patent
Kawakami

(10) Patent No.: US 8,884,473 B2
(45) Date of Patent: Nov. 11, 2014

(54) MOVER, ARMATURE, AND LINEAR MOTOR

(75) Inventor: Makoto Kawakami, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 847 days.

(21) Appl. No.: 13/129,861

(22) PCT Filed: Aug. 24, 2009

(86) PCT No.: PCT/JP2009/004060
§ 371 (c)(1),
(2), (4) Date: May 18, 2011

(87) PCT Pub. No.: WO2010/058500
PCT Pub. Date: May 27, 2010

(65) Prior Publication Data
US 2011/0221283 A1    Sep. 15, 2011

(30) Foreign Application Priority Data
Nov. 18, 2008 (JP) ................................. 2008-294782
Apr. 17, 2009 (JP) ................................. 2009-101138

(51) Int. Cl.
*H02K 41/02* (2006.01)
*H02K 41/03* (2006.01)
*H02K 7/09* (2006.01)
*H02K 1/14* (2006.01)
*H02K 1/27* (2006.01)
*H02K 7/08* (2006.01)

(52) U.S. Cl.
CPC .............. *H02K 41/031* (2013.01); *H02K 7/09* (2013.01); *H02K 2201/06* (2013.01); *H02K 2213/03* (2013.01); *H02K 2207/03* (2013.01); *H02K 1/146* (2013.01); *H02K 1/278* (2013.01); *H02K 7/08* (2013.01)

USPC ..................................... 310/12.15; 310/12.24

(58) Field of Classification Search
USPC .................... 310/12.15, 12.18, 12.24–12.26
See application file for complete search history.

(56) References Cited

U.S. PATENT DOCUMENTS

| 4,641,065 | A | 2/1987 | Shibuki et al. | |
|---|---|---|---|---|
| 6,548,919 | B2* | 4/2003 | Maki et al. | 310/12.21 |
| 6,570,273 | B2 | 5/2003 | Hazelton | |
| 6,614,137 | B2* | 9/2003 | Joong et al. | 310/12.21 |
| 6,943,465 | B2 | 9/2005 | Kim et al. | |
| 7,138,734 | B2* | 11/2006 | Kim et al. | 310/12.31 |
| 7,250,696 | B2* | 7/2007 | Kim et al. | 310/12.05 |

(Continued)

FOREIGN PATENT DOCUMENTS

| EP | 0 580 117 A2 | 1/1994 |
|---|---|---|
| EP | 1 178 589 A1 | 2/2002 |

(Continued)

*Primary Examiner* — Burton Mullins
(74) *Attorney, Agent, or Firm* — Muncy, Geissler, Olds & Lowe, P.C.

(57) ABSTRACT

A mover configured such that a plate-like magnet magnetized in one longitudinal direction, a soft magnetic element, a plate-like magnet magnetized in the other longitudinal direction, and the soft magnetic element are alternately stacked in the order mentioned above continuously is passed through an armature having a configuration in which a first subunit having core portions extending from a yoke portion in a thickness direction of the mover and a second subunit having core portions extending from a yoke portion in a width direction of the mover are alternately disposed to thereby constitute a linear motor. Windings and are collectively wound around the core portions of the second subunit.

3 Claims, 41 Drawing Sheets

(56) References Cited

U.S. PATENT DOCUMENTS

| | | | |
|---|---|---|---|
| 7,777,371 B2 * | 8/2010 | Kim et al. ............ 310/12.25 |
| 2002/0053835 A1 | 5/2002 | Joong et al. |
| 2002/0070612 A1 | 6/2002 | Joong et al. |
| 2004/0256919 A1 | 12/2004 | Hashimoto et al. |
| 2009/0015077 A1 | 1/2009 | Kim et al. |

FOREIGN PATENT DOCUMENTS

| | | |
|---|---|---|
| JP | 4-340352 A | 11/1992 |
| JP | 06-44385 | 6/1994 |
| JP | 08-116658 | 5/1996 |
| JP | 10-327571 A | 12/1998 |
| JP | 2001-028875 | 1/2001 |
| JP | 2002-27731 | 1/2002 |
| JP | 2002-095232 | 3/2002 |
| JP | 2002-125360 | 4/2002 |
| JP | 2002-142439 A | 5/2002 |
| JP | 2002-186243 | 6/2002 |
| JP | 2003-244924 | 8/2003 |
| JP | 2004-166356 | 6/2004 |
| JP | 2005-039883 | 2/2005 |
| JP | 2005-287185 | 10/2005 |
| JP | 2005-295708 | 10/2005 |
| JP | 2006-115665 | 4/2006 |
| JP | 2006-197722 | 7/2006 |
| JP | 2006-320035 | 11/2006 |
| JP | 2007-312575 | 11/2007 |
| WO | WO 2007/116506 A1 | 10/2007 |
| WO | WO 2008/047461 A1 | 4/2008 |

* cited by examiner

⇨ : MAGNETIZATION
    ORIENTATION

⇨ : DIRECTION OF ENERGIZATION

F I G. 5
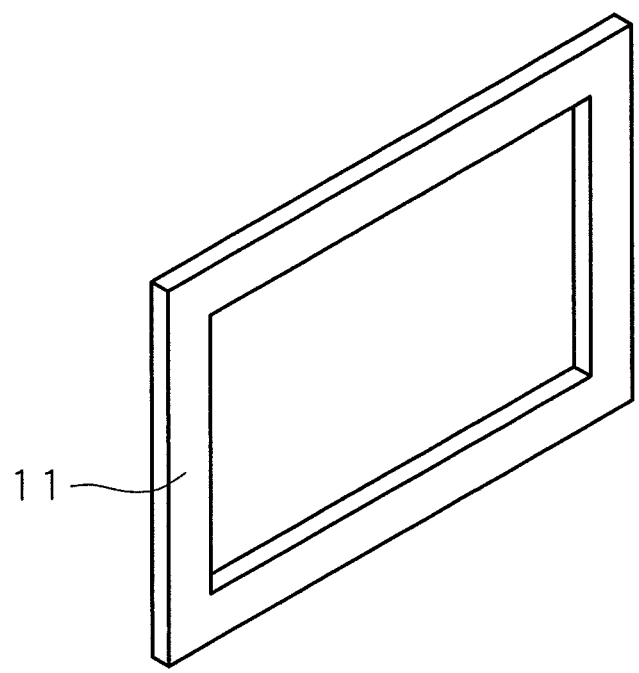

⇨ : MAGNETIZATION
    ORIENTATION

⇨ : DIRECTION OF ENERGIZATION

⇨ : MAGNETOMOTIVE FORCE

⇨ : MAGNETOMOTIVE FORCE

⇨ : MAGNETIZATION
    ORIENTATION

F I G. 1 3
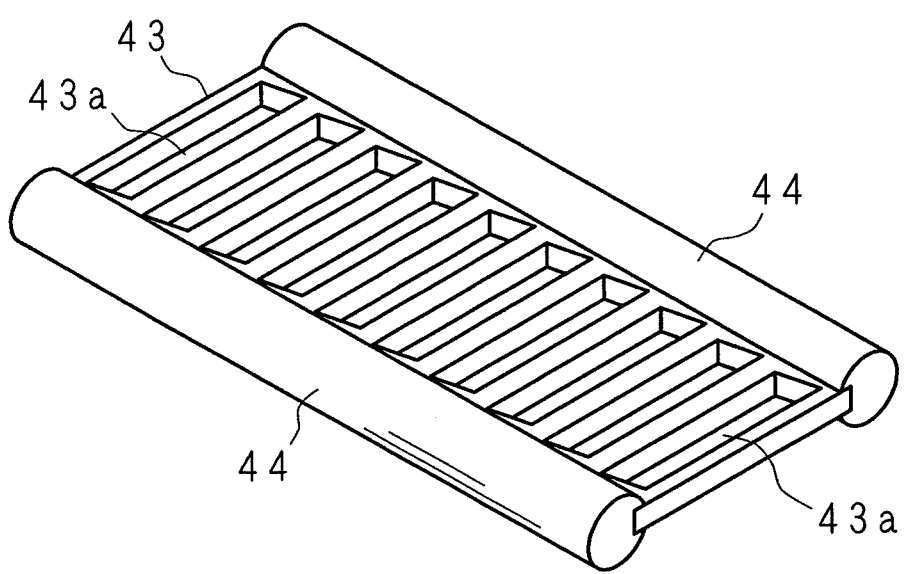

F I G. 1 4 C
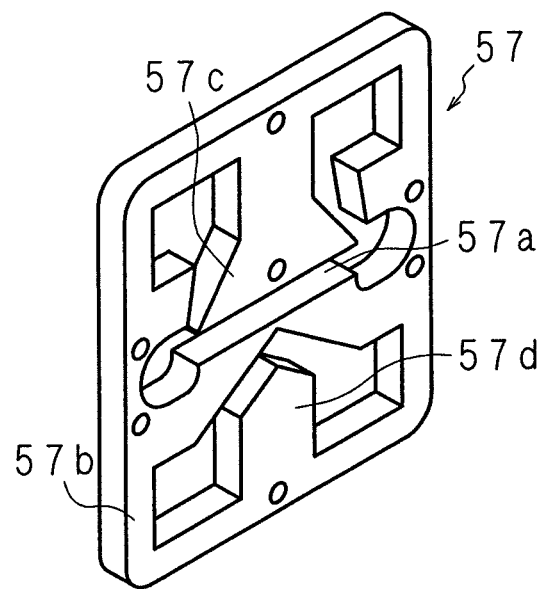
F I G. 1 4 D
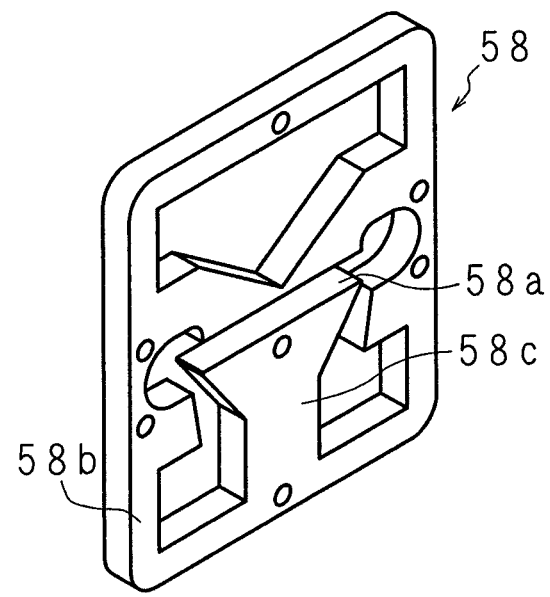

F I G. 1 5 B
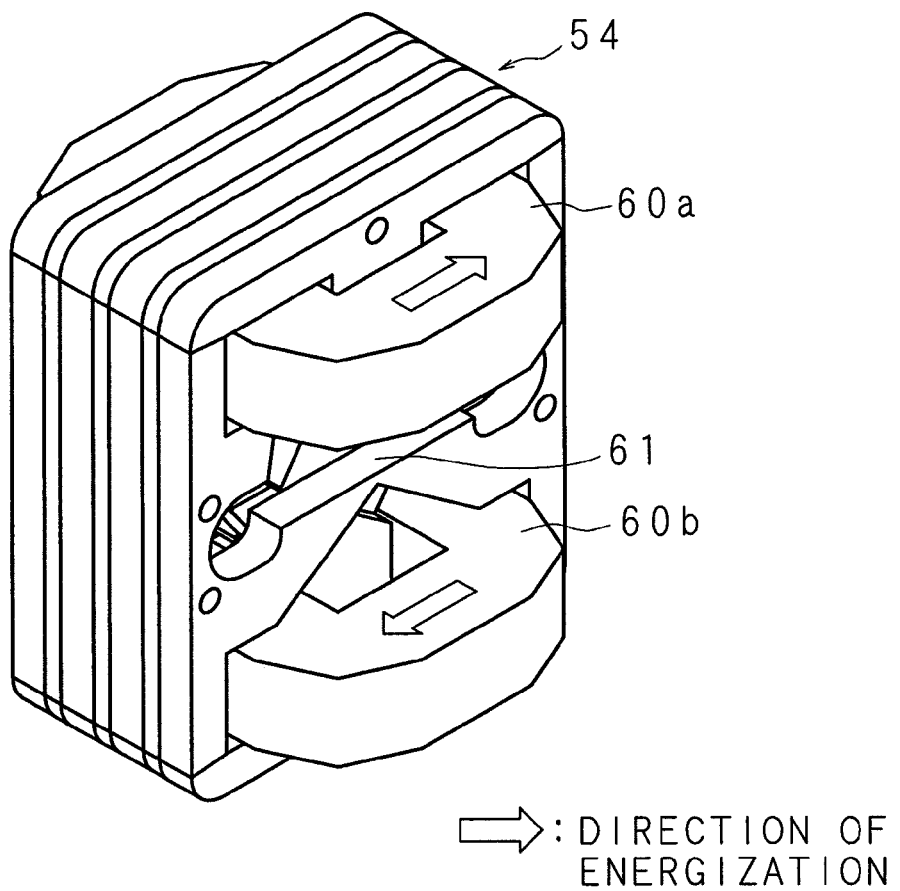
⇒ : DIRECTION OF ENERGIZATION

F I G. 2 2
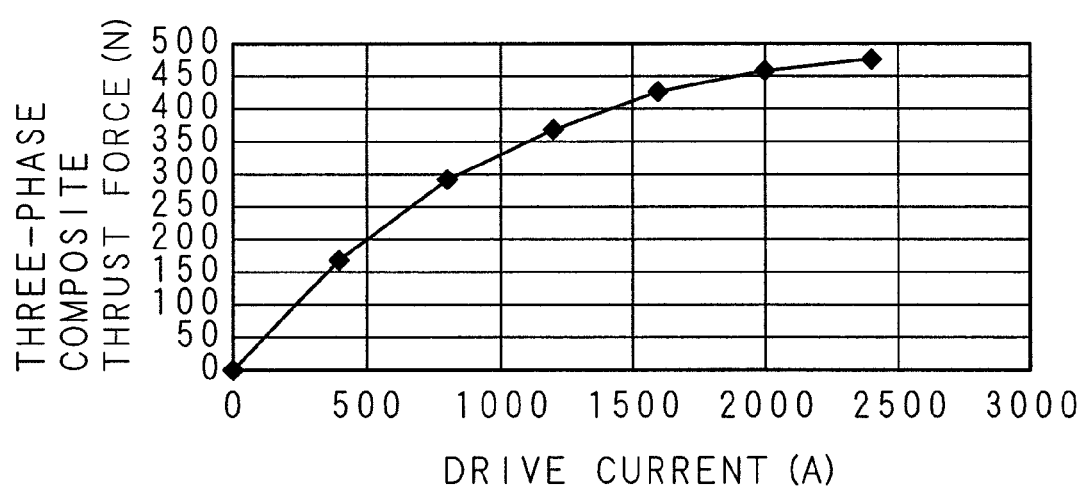

F I G. 2 5
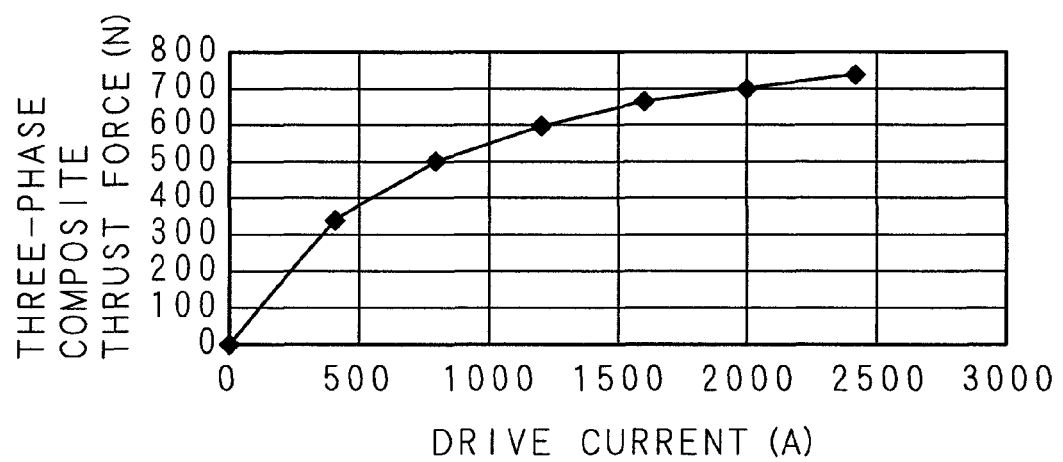

(UNIT:mm)

(UNIT:mm)

(UNIT:mm)

(UNIT:mm)

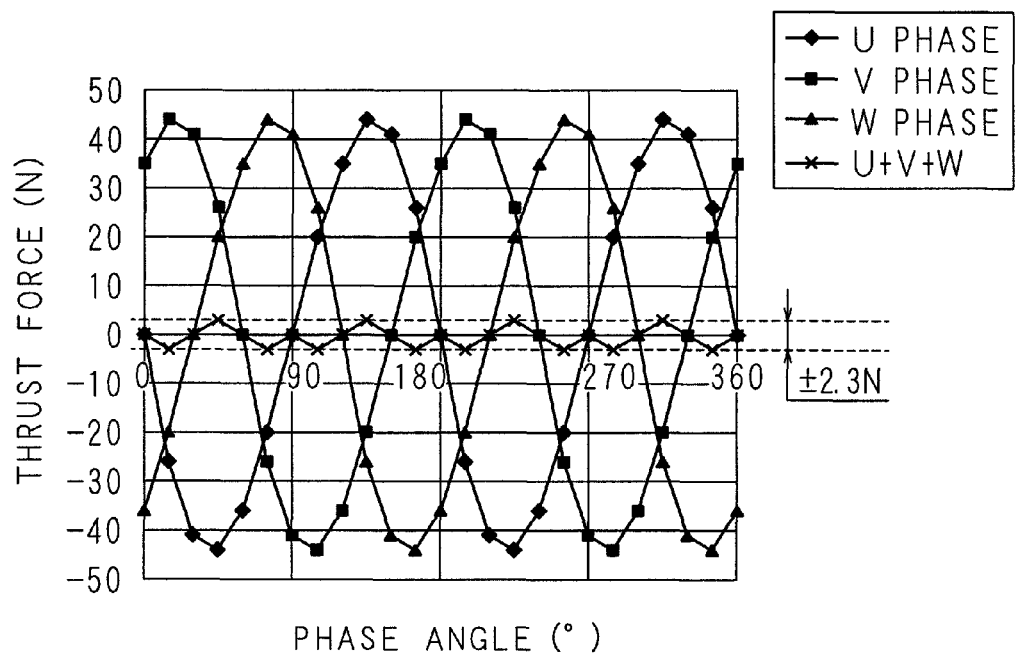
F I G. 3 0

MOVER, ARMATURE, AND LINEAR MOTOR

This application is the national phase under 35 U.S.C. §371 of PCT International Application No. PCT/JP2009/004060 which has an International filing date of Aug. 24, 2009 and designated the United States of America.

BACKGROUND

1. Technical Field

The present invention relates to a mover having a plurality of plate-like permanent magnets, an armature through which the mover is passed, and a linear motor configured such that the mover and the armature (stator) are combined.

2. Description of Related Art

In a vertical movement device of a drill used in a borer for an electronic circuit board or the like, or a vertical movement mechanism in a pick-and-place (pick a component and place it at a predetermined position) robot, high-speed movement and high-precision positioning are required. Consequently, a conventional method of converting an output of a rotation motor to horizontal movement (vertical movement) using a ball screw does not meet such requirements because the conventional method is slow in movement speed.

Consequently, for such vertical movement, the use of a linear motor capable of directly generating a horizontal movement output is promoted. There are proposed, as linear motors, various types of configurations each in which a permanent magnet structure having a large number of plate-like permanent magnets arranged therein is used as a mover, an armature having a winding coil to flow the current is used as a stator, and the mover is arranged in the portion of hole of the stator (e.g., Japanese Patent Application Laid-Open No. 2002-27731, Japanese Patent Application Laid-Open No. 2005-287185 and the like). Among conventional linear motors each in which a magnet is used in the mover, the one configured such that a coil of an armature is individually wound around each magnetic pole has problems that the number of coils is increased so that it becomes difficult to reduce the size, a leakage flux is increased so that efficiency as a linear motor is lowered and, accordingly, it becomes difficult to achieve a reduction in size and an increase in output. In order to solve the problems, there is proposed a linear motor using a claw-pole (claw-teeth) armature (e.g., Japanese Patent Application Laid-Open No. 2005-295708 and the like).

SUMMARY

In a conventional linear motor, response is quick as compared with the case where a ball screw is used, but it is not possible to realize response speed at a required level due to large mass of a mover though it is possible to secure sufficient thrust force. Although the structure of a linear motor suitable for speedup is a movable magnet type structure, when a magnetic pole pitch is large, the amount of a magnetic flux that travels around to reach a yoke on a back surface of a magnet is increased so that the volume of the yoke is increased, and the weight of the mover is increased. On the other hand, when the magnetic pole pitch is reduced, a winding structure in an armature becomes complicated so that it becomes difficult to realize a linear motor having smaller size and higher output. In addition, because its weight is influential in the use for vertical movement, a reduction in weight is increasingly desired.

The present invention has been achieved in view of the foregoing circumstances, and an object thereof is to provide a plate-like mover that has a large amount of a generated magnetic flux, and is light in weight.

Another object of the present invention is to provide an armature in which a winding structure does not become complicated even when a magnetic pole pitch is small, and magnetic saturation is unlikely to occur.

Still another object of the present invention is to provide a linear motor that has a structure in which the magnetic saturation is unlikely to occur, and is capable of realizing high-speed response and enhancing conversion efficiency of the motor to increase power density.

A first mover according to the present invention is a mover of a linear motor having a plurality of plate-like magnets, wherein one of the plurality of plate-like magnets and a plate-like soft magnetic element are alternately stacked, and the plurality of plate-like magnets include the plate-like magnet magnetized in a longitudinal direction of the mover in a stacking direction and the plate-like magnet magnetized in a direction opposite to the longitudinal direction in the stacking direction that are alternately disposed.

The first mover of the present invention is configured such that the plate-like magnet magnetized in one stacking direction (longitudinal direction), the soft magnetic element, the plate-like magnet magnetized in the other stacking direction (longitudinal direction), and the soft magnetic element are stacked in this order mentioned above continuously. With this configuration, the soft magnetic element inserted between the two plate-like magnets having magnetization orientations different from each other by 180 degrees has a function of changing a direction of magnetic flux from the plate-like magnet to a thickness direction, and the configuration generates the magnetic flux in a direction perpendicular to the longitudinal direction (movement direction) as a magnetic circuit of the entire mover. Consequently, since the soft magnetic element operates as a return path of the magnetic flux to be able to reduce the magnetic flux leaked to the outside, the plate-like mover of the present invention secures the sufficient amount of the magnetic flux in spite of its light weight. It is to be noted that the longitudinal direction of the mover means the movement direction of the mover, the width direction of the mover means a direction orthogonal to both of the movement direction of the mover and the direction of the magnetic flux generated from the mover, and the thickness direction of the mover means a direction in parallel with the direction of the magnetic flux generated from the mover.

A first armature according to the present invention is an armature of a linear motor through which a plate-like mover is passed, wherein a first subunit made of a soft magnetic material and having an opening portion through which the mover is passed, a yoke portion disposed outside the opening portion, and a core portion provided to extend from the yoke portion in a thickness direction of the mover, and a second subunit made of the soft magnetic material and having an opening portion through which the mover is passed, a yoke portion disposed outside the opening portion, and a core portion provided to extend from the yoke portion in a width direction of the mover are alternately stacked, and a winding is wound around a plurality of the core portions of the first subunit and/or a plurality of the core portions of the second subunit.

In the first armature of the present invention, the first subunit having the opening portion through which the mover is passed, the frame-like yoke portion disposed outside the opening portion, and the core portion provided to extend from the yoke portion in the thickness direction of the mover, and the second subunit having the opening portion through which the mover is passed, the frame-like yoke portion disposed outside the opening portion, and the core portion provided to extend from the yoke portion in the width direction of the mover are alternately stacked, and the winding is collectively wound around the plurality of the core portions of the first subunit and/or the plurality of the core portions of the second subunit. Since the winding is wound around the plurality of the core portions of the subunit instead of individually setting a winding around each magnetic pole, the winding structure is simple, and it is easy to reduce the size.

In the first armature according to the present invention, the core portion of the second subunit is tapered from its middle toward the opening portion.

In the first armature of the present invention, the core portion of the second subunit is tapered from its middle toward the opening portion, and the portion where the core portion of the first subunit and the core portion of the second subunit are overlapped is thereby reduced to lower the leakage of the magnetic flux. In addition, since the core portion of the second subunit on the side with the yoke portion is not tapered but widened, the path for the magnetic flux traveling toward the yoke portion is wide so that the magnetic saturation is unlikely to occur in the portion.

In the first armature according to the present invention, a spacer made of the soft magnetic material is inserted between the stacked first and second subunits such that the core portions do not come in contact with each other.

In the first armature of the present invention, the frame-like spacer is provided between the first and second subunits. Consequently, the simple configuration realizes non-contact between the core portions of the first and second subunits (avoidance of a magnetic short circuit).

A first linear motor according to the present invention is a linear motor, wherein a mover in which a plate-like magnet and a plate-like soft magnetic element are alternately stacked, and the plate-like magnet includes the plate-like magnet magnetized in a longitudinal direction of the mover in a stacking direction and the plate-like magnet magnetized in a direction opposite to the longitudinal direction in the stacking direction that are alternately disposed is passed through an opening portion of a first subunit and an opening portion of a second subunit of an armature in which the first subunit made of a soft magnetic material and having the rectangular opening portion, a yoke portion disposed outside the opening portion, and a core portion provided to extend from the yoke portion in a thickness direction of the mover, and the second subunit made of the soft magnetic material and having the rectangular opening portion, a yoke portion disposed outside the opening portion, and a core portion provided to extend from the yoke portion in a width direction of the mover are alternately stacked, and a winding is wound around a plurality of the core portions of the first subunit and/or a plurality of the core portions of the second subunit.

In the first linear motor of the present invention, the configuration is adopted in which the above-described mover is passed through the above-described first armature. Since it is possible to reduce the weight of the mover, the response speed of the mover is increased. In addition, the winding structure in the armature is simple, and it is possible to reduce the size.

A second armature according to the present invention is an armature of a linear motor through which a plate-like mover is passed, wherein a first subunit made of a soft magnetic material and having an opening portion through which the mover is passed, a yoke portion disposed outside the opening portion, a first core portion provided to extend from the yoke portion on one side in a thickness direction of the mover, and a second core portion provided to extend in a width direction of the mover, and a second subunit made of the soft magnetic material and having an opening portion through which the mover is passed, a yoke portion disposed outside the opening portion, and a first core portion and a second core portion that are provided at positions symmetrical to those of the first core portion and the second core portion of the first subunit and provided to extend from the yoke portion are alternately stacked, and a winding is wound around a plurality of the second core portions of the first subunit and the second subunit and/or a plurality of the first core portions of the first subunit and the second subunit.

In the second armature of the present invention, the first subunit having the opening portion through which the mover is passed, the frame-like yoke portion disposed outside the opening portion, the first core portion provided to extend from the yoke portion on one side in the thickness direction of the mover, and the second core portion provided to extend in the width direction of the mover, and the second subunit in a shape point-symmetrical to that of the first subunit having the opening portion through which the mover is passed, the frame-like yoke portion disposed outside the opening portion, the first core portion provided to extend from the yoke portion on the other side in the thickness direction of the mover, and the second core portion provided to extend in the width direction of the mover are alternately stacked, and the winding is collectively wound around the plurality of the second core portions of the first subunit and the second subunit and/or the plurality of the first core portions of the first subunit and the second subunit. Since the winding is collectively wound around the plurality of the core portions of the first and second subunits instead of individually setting a winding around each magnetic pole, the winding structure is simple, and it is easy to reduce the size.

In the second armature according to the present invention, the second core portion of each of the first and second subunits is tapered from its middle toward the opening portion, and has a rib on its side with the yoke portion.

In the second armature of the present invention, the second core portions of the first and second subunits are tapered from their middles toward the opening portions, and the portions where the second core portions and the first core portions of the first and second subunits are overlapped are thereby reduced to lower the leakage of the magnetic flux. In addition, the ribs are provided in the second core portions on the sides with the yoke portions of the first and second subunits. Accordingly, the paths for the magnetic flux traveling toward the yoke portions are wide so that the magnetic saturation is unlikely to occur in the portions.

In the second armature according to the present invention, a spacer made of the soft magnetic material is inserted between the stacked first and second subunits such that the first core portion or the second core portion of the first subunit does not come in contact with the first core portion or the second core portion of the second subunit.

In the second armature of the present invention, the frame-like spacer is provided between the first and second subunits. Accordingly, the simple configuration realizes non-contact between the first and second core portions of the first subunit and the first and second core portions of the second subunit (avoidance of the magnetic short circuit).

A second linear motor according to the present invention is a linear motor, wherein a mover having a plurality of plate-like magnets magnetized in a thickness direction in which the plurality of plate-like magnets include the plate-like magnet magnetized in one thickness direction and the plate-like magnet magnetized in a direction opposite to the one thickness direction that are alternately disposed is passed through an opening portion of a first subunit and an opening portion of a second subunit of an armature in which the first subunit made of a soft magnetic material and having the rectangular opening portion, a yoke portion disposed outside the opening portion, a first core portion provided to extend from the yoke portion on one side in a thickness direction of the mover, and a second core portion provided to extend in a width direction of the mover, and the second subunit made of the soft magnetic material and having the rectangular opening portion, a yoke portion disposed outside the opening portion, and a first core portion and a second core portion that are provided at positions symmetrical to those of the first core portion and the second core portion of the first subunit and provided to extend from the yoke portion are alternately stacked, and a winding is wound around a plurality of the second core portions of the first subunit and the second subunit and/or a plurality of the first core portions of the first subunit and the second subunit.

In the second linear motor of the present invention, the configuration is adopted in which the mover in which the plate-like magnet magnetized in one thickness direction and the plate-like magnet magnetized in the other thickness direction are alternately disposed is passed through the above-described second armature. Since it is possible to reduce the weight of the mover, the response speed of the mover is increased. In addition, the winding structure in the armature is simple, and it is possible to reduce the size.

A second mover according to the present invention is a mover of a linear motor having a plurality of plate-like magnets, wherein each of the plurality of plate-like magnets magnetized in a thickness direction is disposed in each of a plurality of holes formed parallelly in a rectangular magnet holding spacer made of a non-magnetic material such that the plate-like magnet magnetized in one thickness direction and the plate-like magnet magnetized in a direction opposite to the one thickness direction are alternately arranged, and a linear guide rail is provided on a frame extending in a longitudinal direction on either side in a width direction of the magnet holding spacer.

In the second mover of the present invention, each of the plurality of plate-like magnets is bonded to be held in each of the plurality of holes formed parallelly in the magnet holding spacer made of the non-magnetic material, and the linear guide rail is provided to extend in the longitudinal direction on either side in the width direction of the magnet holding spacer. Consequently, since the mover is pressed by the linear guide rail in a lateral direction, the mechanical strength of the mover is enhanced, and a flexural vibration, a resonant vibration, and the like are suppressed so that it becomes possible to perform high-speed linear movement without vibrations.

In the second mover according to the present invention, a longitudinal direction of the plate-like magnet is skewed from an opposing direction of the linear guide rails.

In the second mover of the present invention, the longitudinal direction of the plate-like magnet is skewed from the opposing direction of the linear guide rails by a predetermined angle. Accordingly, when the mover is moved at a constant speed, it is possible to reduce jerky movement (cogging).

A third armature according to the present invention is an armature of a linear motor through which a plate-like mover is passed, wherein a first subunit made of a soft magnetic material and having an opening portion through which the mover is passed, a yoke portion disposed outside the opening portion, and a core portion provided to extend from the yoke portion on one side in a thickness direction of the mover, a second subunit made of the soft magnetic material and having an opening portion through which the mover is passed, a yoke portion disposed outside the opening portion, an auxiliary core portion provided to extend from the yoke portion on one side in the thickness direction of the mover, and a core portion provided to extend from the yoke portion on the other side in the thickness direction of the mover, a third subunit made of the soft magnetic material and having an opening portion through which the mover is passed, a yoke portion disposed outside the opening portion, a core portion provided to extend from the yoke portion on one side in the thickness direction of the mover, and an auxiliary core portion provided to extend from the yoke portion on the other side in the thickness direction of the mover, and a fourth subunit made of the soft magnetic material and having an opening portion through which the mover is passed, a yoke portion disposed outside the opening portion, and a core portion provided to extend from the yoke portion on the other side in the thickness direction of the mover are stacked in this order, a spacer unit made of the soft magnetic material and having an opening portion through which the mover is passed, a yoke portion disposed outside the opening portion, and an auxiliary core portion provided to extend from the yoke portion on either side in the thickness direction of the mover is provided between the first subunit and the second subunit, between the second subunit and the third subunit, and between the third subunit and the fourth subunit, and a winding is collectively wound around the core portion of the first subunit, the auxiliary core portion of the second subunit, the core portion of the third subunit, and the auxiliary core portion on one side in the thickness direction of the mover of the spacer unit, and a winding is collectively wound around the core portion of the second subunit, the auxiliary core portion of the third subunit, the core portion of the fourth subunit, and the auxiliary core portion on the other side in the thickness direction of the mover of the spacer unit.

In the third armature of the present invention, the first subunit, the spacer unit, the second subunit, the spacer unit, the third subunit, the spacer unit, and the fourth subunit each having the above-described configuration are stacked in this order, and the windings are collectively wound around the core portion of the first subunit, the auxiliary core portion of the second subunit, the core portion of the third subunit, and the auxiliary core portion on one side in the thickness direction of the mover of each spacer unit, and around the core portion of the second subunit, the auxiliary core portion of the third subunit, the core portion of the fourth subunit, and the auxiliary core portion on the other side in the thickness direction of the mover of each spacer unit. Since the windings are collectively wound instead of individually setting a winding around each magnetic pole, the winding structure is simple, and it is easy to reduce the size. In addition, since the first and fourth subunits around which one of the windings is not wound are disposed at both ends, it is possible to reduce winding space for the windings.

In the third armature according to the present invention, each of the first subunit, the second subunit, the third subunit, the fourth subunit, and the spacer unit is divided at an identical position in the thickness direction of the mover.

In the third armature of the present invention, each of the first to fourth subunits and the spacer unit is divided in the thickness direction. Accordingly, it is possible to set the winding in a state where they are divided, and the winding process is easy so that it is possible to easily produce the armature.

A third linear motor according to the present invention is a linear motor, wherein a mover in which each of a plurality of plate-like magnets magnetized in a thickness direction is disposed in each of a plurality of holes formed parallelly in a rectangular magnet holding spacer made of a non-magnetic material such that the plate-like magnet magnetized in one thickness direction and the plate-like magnet magnetized in a direction opposite to the one thickness direction are alternately arranged, and a linear guide rail is provided on a frame extending in a longitudinal direction on either side in a width direction of the magnet holding spacer is passed through an opening portion of a first subunit, an opening portion of a second subunit, an opening portion of a third subunit, an opening portion of a fourth subunit, and an opening portion of a spacer unit of an armature in which the first subunit made of a soft magnetic material and having the rectangular opening portion, a yoke portion disposed outside the opening portion, and a core portion provided to extend from the yoke portion on one side in a thickness direction of the mover, the second subunit made of the soft magnetic material and having the rectangular opening portion, a yoke portion disposed outside the opening portion, an auxiliary core portion provided to extend from the yoke portion on one side in the thickness direction of the mover, and a core portion provided to extend from the yoke portion on the other side in the thickness direction of the mover, the third subunit made of the soft magnetic material and having the rectangular opening portion, a yoke portion disposed outside the opening portion, a core portion provided to extend from the yoke portion on one side in the thickness direction of the mover, and an auxiliary core portion provided to extend from the yoke portion on the other side in the thickness direction of the mover, and the fourth subunit made of the soft magnetic material and having the rectangular opening portion, a yoke portion disposed outside the opening portion, and a core portion provided to extend from the yoke portion on the other side in the thickness direction of the mover are stacked in this order, the spacer unit made of the soft magnetic material and having the rectangular opening portion, a yoke portion disposed outside the opening portion, and an auxiliary core portion provided to extend from the yoke portion on either side in the thickness direction of the mover is provided between the first subunit and the second subunit, between the second subunit and the third subunit, and between the third subunit and the fourth subunit, a winding is collectively wound around the core portion of the first subunit, the auxiliary core portion of the second subunit, the core portion of the third subunit, and the auxiliary core portion on one side in the thickness direction of the mover of the spacer unit, and a winding is collectively wound around the core portion of the second subunit, the auxiliary core portion of the third subunit, the core portion of the fourth subunit, and the auxiliary core portion on the other side in the thickness direction of the mover of the spacer unit.

In the third linear motor of the present invention, the configuration is adopted in which the above-described second mover is passed through the above-described third armature. Since it is possible to reduce the weight of the mover, the response speed of the mover is increased. In addition, the winding structure in the armature is simple, and it is possible to reduce the size. Further, since the surrounding portion of each linear guide rail becomes the same magnetic pole, even when the linear guide rail made of the magnetic material is used, the magnetic flux is not leaked in the direction of the linear guide rail so that a reduction in thrust force does not occur.

Although the linear motor using the claw-pole (claw-teeth) armature as described in Japanese Patent Application Laid-Open No. 2005-295708 is effective in saving coil space because coils in the armature may be integrated, the linear motor has a problem that the amount of the leakage flux is large so that the maximum thrust force is reduced. In contrast to this, the present invention has effects that, because coils in the armature may be integrated and the occurrence of the leakage flux from a core portion is limited to a small value, a reduction in thrust force does not occur, and it is possible to promote a reduction in the size and an increase in the output of a linear motor, and provide a linear motor capable of realizing high efficiency and high thrust force in spite of its small configuration.

The above and further objects and features will more fully be apparent from the following detailed description with accompanying drawings.

BRIEF DESCRIPTION OF THE SEVERAL VIEWS OF THE DRAWINGS

FIG. 5 is a perspective view illustrating a spacer unit used in the armature according to the first embodiment;

FIG. 13 is a perspective view illustrating another example of the partial configuration of the mover according to the third embodiment;

FIGS. 14A to 14E are views illustrating configurations of first to fourth subunits and a spacer unit used in an armature according to the third embodiment;

FIGS. 15A and 15B are perspective views each illustrating a configuration of the armature according to the third embodiment;

FIG. 22 is a graph illustrating a result of measurement of thrust force characteristics in the linear motor according to Example 1;

FIG. 25 is a graph illustrating a result of measurement of thrust force characteristics in the linear motor according to Example 2;

FIG. 30 is a graph illustrating a result of measurement of thrust force characteristics in the linear motor according to Example 3.

DETAILED DESCRIPTION

A detailed description will be given hereinbelow of the present invention on the basis of the drawings illustrating its embodiments.

First Embodiment

Figure 1:
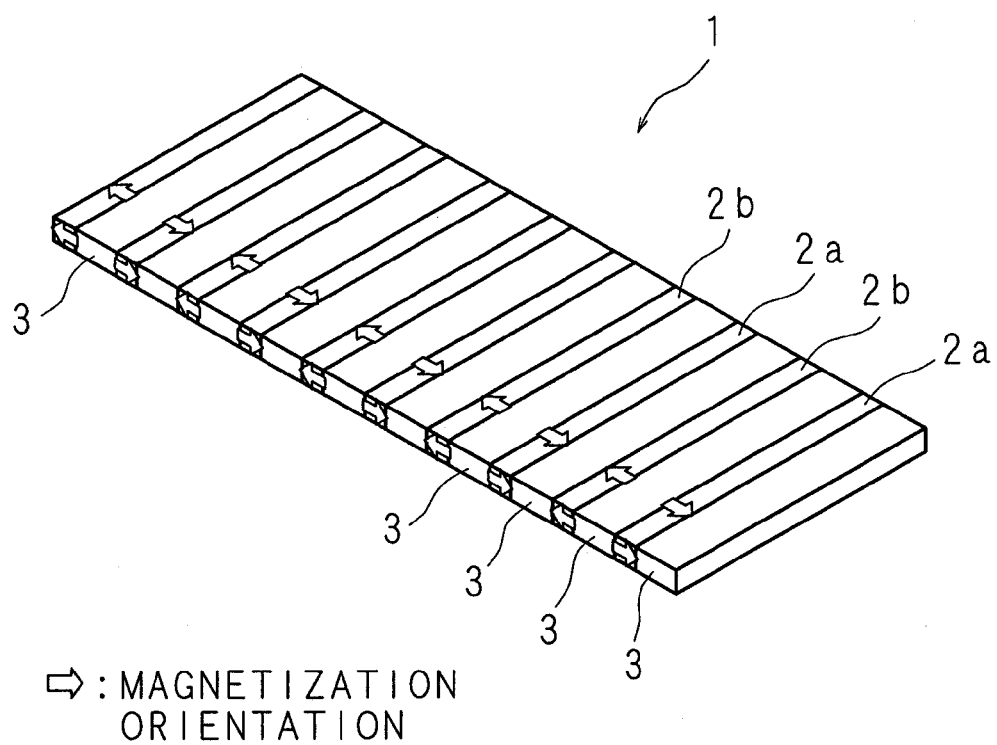
FIG. 1 is a perspective view illustrating a configuration of a mover according to a first embodiment.

FIG. 1 is a perspective view illustrating a configuration of a mover according to a first embodiment. A mover 1 of the first embodiment is configured such that two types of plate-like magnets 2a and 2b and a plate-like soft magnetic element 3 are combined, and the plate-like magnets 2a, the soft magnetic element 3, the plate-like magnet 2b, and the soft magnetic element 3 are alternately bonded together in this order mentioned above continuously.

In FIG. 1, open arrows indicate magnetization orientations of the plate-like magnets 2a and 2b. Although both of the plate-like magnets 2a and 2b are magnetized in a stacking direction, i.e., in a movement direction of the mover 1 (longitudinal direction of the mover 1), the magnetization orientations thereof are opposite to each other by 180 degrees. In addition, between the adjacent plate-like magnets 2a and 2b, the plate-like soft magnetic element 3 is inserted.

The soft magnetic element 3 has a role of changing the direction of magnetic fluxes from the plate-like magnets 2a and 2b to a thickness direction of the mover 1. The mover 1 has a magnetic circuit configuration in which the magnetic flux is generated in a direction perpendicular to the longitudinal direction (movement direction).

Figure 2A:
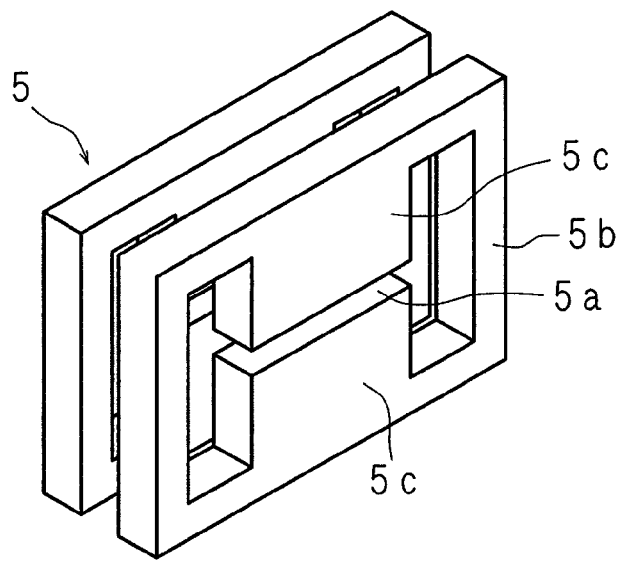
FIGS. 2A to 2D are perspective views each illustrating a configuration of an armature according to the first embodiment.
Figure 2B:
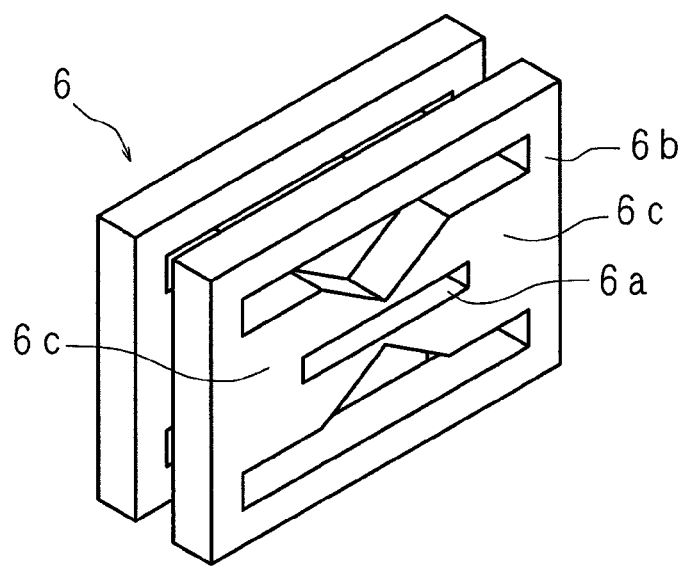
Figure 2C:
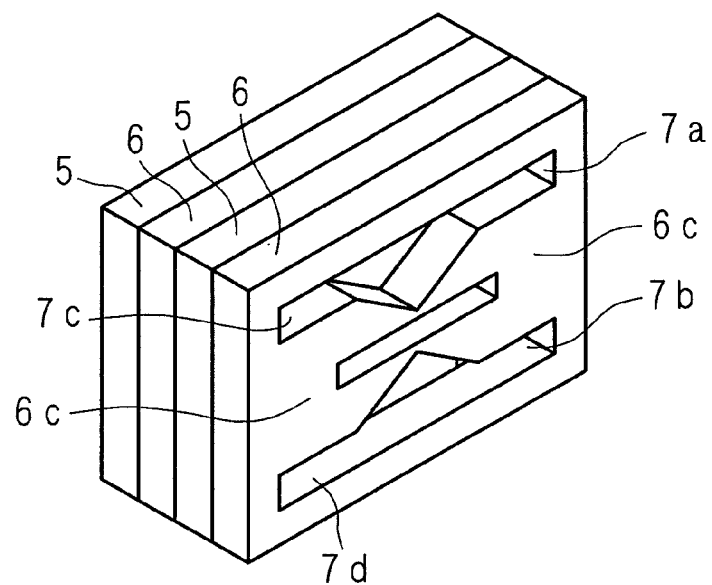
Figure 2D:
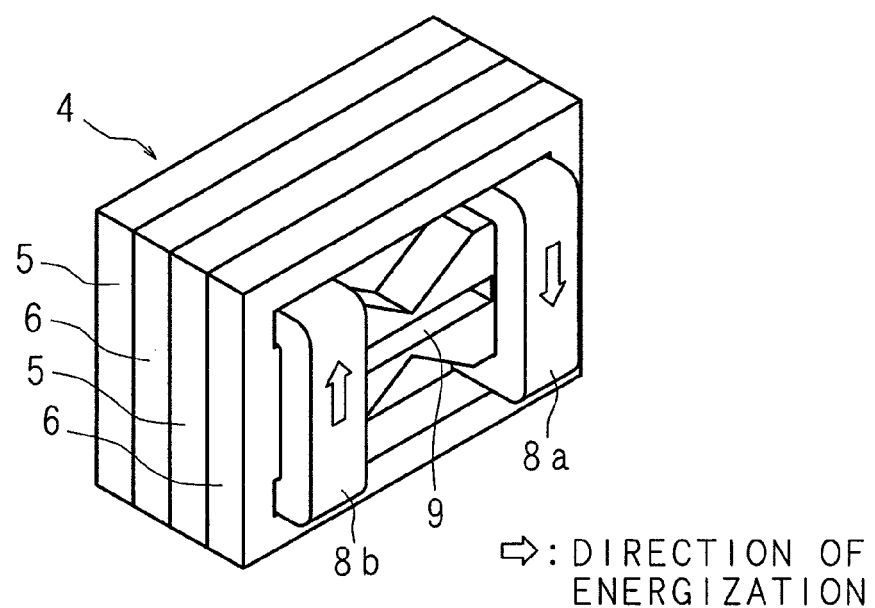

FIGS. 2A to 2D are perspective views each illustrating a configuration of an armature according to the first embodiment, in which FIGS. 2A to 2C are views illustrating partial configurations thereof, while FIG. 2D is a view illustrating an entire configuration thereof.

An armature 4 has a configuration in which a first subunit 5 illustrated in FIG. 2A and a second subunit 6 illustrated in FIG. 2B are alternately disposed (see FIG. 2C). The first subunit 5 is made of a soft magnetic material, and has an opening portion 5a through which the mover 1 is passed, a yoke portion 5b as a frame that is disposed outside the opening portion 5a, and two core portions 5c and 5c that extend from the yoke portion 5b toward the opening portion 5a in the thickness direction of the mover 1. The two core portions 5c and 5c have the same rectangular shape when viewed in a plane view, and are disposed at positions spaced apart by 180 degrees about the opening portion 5a.

The second subunit 6 is made of the soft magnetic material, and has an opening portion 6a through which the mover 1 is passed, a yoke portion 6b as a frame that is disposed outside the opening portion 6a, and two core portions 6c and 6c that extend from the yoke portion 6b in the width direction of the mover 1. In each of the core portions 6c and 6c, a base end portion thereof on the side with the yoke portion 6b has a rectangular shape when viewed in a plane view, and an end portion thereof on the side with the opening portion 6a has a tapered quadrangular shape that becomes narrower toward the center when viewed in a plane view. The end portions of the core portions 6c and 6c are linked with each other.

In each of the first and second subunits 5 and 6, the thickness of each of the core portions is formed to be thinner than that of the yoke portion so that the core portions of the subunits 5 and 6 are not brought into contact with each other when the subunits 5 and 6 are stacked. Such first and second subunits 5 and 6 are alternately disposed and stacked as illustrated in FIG. 2C. Herein, in the adjacent first and second subunits 5 and 6, their respective yoke portions 5b and 6b are held in contact with each other, but their respective core portions 5c and 6c are not in contact with each other, and a gap is present therebetween to avoid a magnetic short circuit.

A winding 8a is passed through gap portions 7a and 7b common to the first and second subunits 5 and 6, and is collectively wound around one core portions 6c (the core portion 6c on the right side in FIGS. 2B and 2C) in the second subunits 6, while a winding 8b is passed through gap portions 7c and 7d common to the first and second subunits 5 and 6, and is collectively wound around the other core portions 6c (the core portion 6c on the left side in FIGS. 2B and 2C) in the second subunits 6. Further, both of the windings 8a and 8b are connected with each other such that respective directions of energization of the windings 8a and 8b become opposite to each other (see FIG. 2D). Open arrows in FIG. 2D indicate the directions of energization in the windings 8a and 8b.

Figure 3:
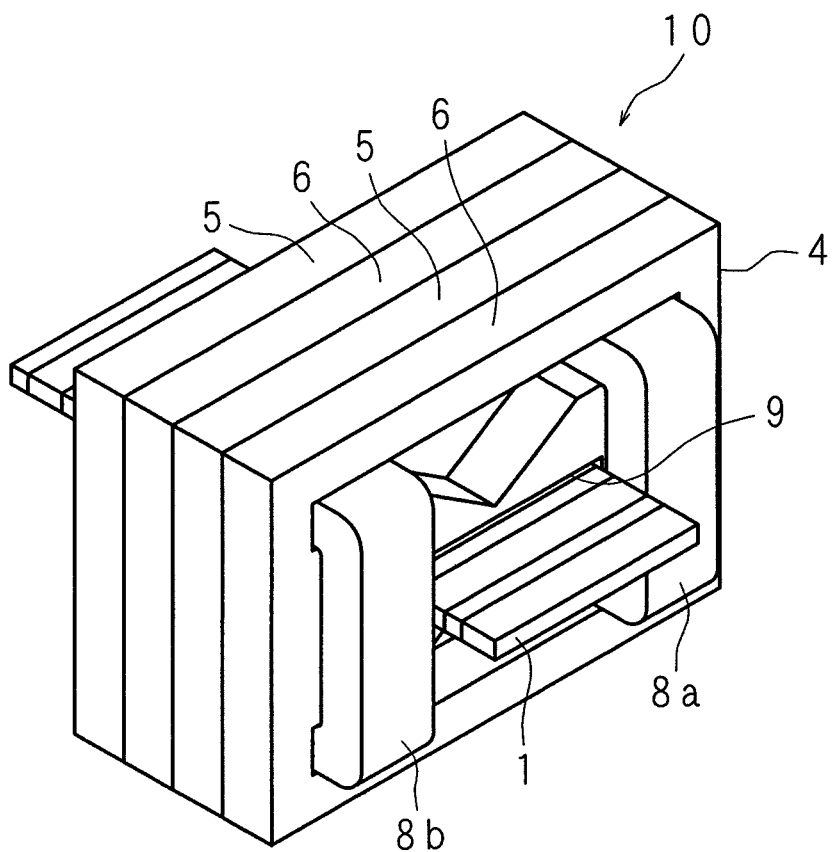
FIG. 3 is a perspective view illustrating a configuration of a linear motor according to the first embodiment.

Subsequently, the above-described mover 1 illustrated in FIG. 1 is passed through a hollow portion 9 formed by joining the opening portions 5a and 6a of the armature 4 illustrated in FIG. 2D, and a single-phase drive linear motor (a unit for a single phase) 10 according to the first embodiment is thereby constituted. FIG. 3 is a perspective view illustrating the configuration of the linear motor 10 according to the first embodiment.

In the linear motor of the first embodiment, the armature 4 functions as a stator. By passing current through the windings 8a and 8b in opposite directions, the mover 1 passed through the hollow portion 9 of the armature 4 performs reciprocating linear movement with respect to the armature 4 (stator).

Figure 4:
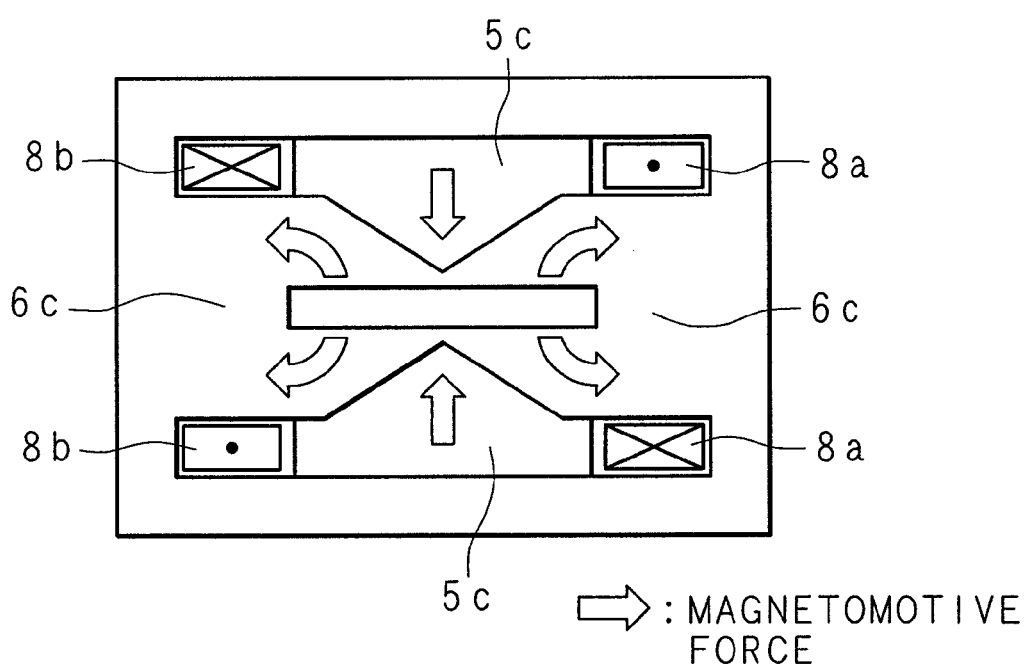
FIG. 4 is a cross-sectional view illustrating a flow of the current and a magnetomotive force in the armature according to the first embodiment.

FIG. 4 is a cross-sectional view illustrating a flow of the current and a magnetomotive force in the armature 4 of the first embodiment. In FIG. 4, "● (direction of applied current from the back side to the front side of the paper sheet)" and "× (direction of applied current from the front side to the back side of the paper sheet)" denote directions of current to the windings 8a and 8b, and open arrows indicate directions of the magnetomotive force applied to the core portions 5c and 6c by coil energization. In the first embodiment, by passing current through the coils 8a and 8b in opposite directions, magnetic fields are generated in all of the core portions 5*c* and 6*c* of the first and second subunits 5 and 6.

In the example described above, in each subunit, the thickness of each of the core portions is formed to be thinner than that of the yoke portion so that the respective core portions of both of the subunits are not brought into contact with each other when the subunits are stacked. However, a configuration may also be adopted in which, by inserting a spacer unit 11 made of the soft magnetic material consisting only of a frame-like yoke as illustrated in FIG. 5 between the adjacent subunits, the core portions of the subunits are not brought into contact with each other even when each of the subunits is formed to have a uniform thickness entirely.

In the thus-configured armature 4, the first subunit 5, the spacer unit 11, the second subunit 6, and the spacer unit 11 are stacked in this order mentioned above continuously. In this example, since it is not necessary to make the thickness of the core portion thinner than that of the yoke portion so that an additional working process is not required, and it is possible to use the subunit having a uniform thickness entirely, it is possible to simplify production processes.

The mover in the first embodiment described above has a large amount of the magnetic flux in spite of its plate-like shape, and is light in weight. In addition, in the armature in the first embodiment, the winding structure does not become complicated even when the magnetic pole pitch is small, and the magnetic saturation is unlikely to occur. Further, since the linear motor in the first embodiment has the structure in which the magnetic saturation is unlikely to occur, the linear motor is capable of realizing high-speed response, and enhancing the conversion efficiency of the motor to achieve a reduction in size and an increase in output.

The purpose of forming each of the core portions 6*c* of the second subunit 6 in the first embodiment into the shape that is tapered from the middle thereof toward the opening portion 6*a* is to reduce an area of the portion where the core portions 5*c* of the first subunit 5 and the core portions 6*c* of the second subunit 6 oppose each other. Since the floe of the current is performed using the windings 8*a* and 8*b* common to the first and second subunits 5 and 6, the opening portion 5*a* and the opening portion 6*a* become opposite in polarity, as illustrated in FIG. 4. Consequently, the leakage flux (total magnetic flux) that occurs in air space and does not contribute to an output is proportional to the area of the portion where the core portions oppose each other, and hence the opposing area of the core portions 5*c* and 6*c* is reduced in order to reduce the leakage (transition) of the magnetic flux from the core portion 5*c* to the core portion 6*c*.

Note that the base end portion of each of the core portions 6*c* of the second subunit 6 on the side with the yoke portion 6*b* is not formed into the tapered shape, and the width thereof remains wide. This is because, when the width of this portion is narrow, a path for the magnetic flux becomes narrow so that the magnetic saturation is likely to occur. In the first embodiment, the width of the base end portion of the core portion 6*c* on the side with the yoke portion 6*b* is kept wide to suppress the occurrence of the magnetic saturation in this portion.

Although the linearly tapered shape is formed in the example illustrated in the drawings, the tapered shape to be formed may also be curvilinear. In addition, although the shape of each of gap portions (notch portions) in the second subunit 6 when viewed in a plane view is formed into a V shape as shown in FIG. 2, the shape may also be other shapes such as a U shape and the like.

In the above-described first embodiment, although the windings 8*a* and 8*b* are collectively wound around the core portions 6*c* of the second subunits 6, the windings may also be wound around the core portions 5*c* of the first subunits 5. In addition, the windings may also be wound around both of the core portions 5*c* of the first subunits 5 and the core portions 6*c* of the second subunits 6.

In the above-described first embodiment, although the configuration is adopted in which ten of the plate-like magnets 2*a* and 2*b* each having five units, and ten of the soft magnetic elements 3 are sequentially stacked, the configuration is only one example, and each of the numbers of magnets and soft magnetic elements may be an arbitrary number. In addition, although the first subunit 5 and the second subunit 6 are alternately disposed to form two pairs of the first and second subunits 5 and 6, this is only one example, and the number of pairs may be an arbitrary number.

Further, although the description has been given of the single-phase linear motor (the unit for the single phase), when e.g., a three-phase drive linear motor is constituted, three of the above-described armatures may be linearly disposed at the spacing of a magnetic pole pitch$\times (n+\frac{1}{3})$ or a magnetic pole pitch$\times (n+\frac{2}{3})$ (wherein n is an integer), and the mover may be appropriately passed through the armatures. Note that, in this case, the integer n may be appropriately set in consideration of the space for accommodating the windings.

Second Embodiment

Figure 6:
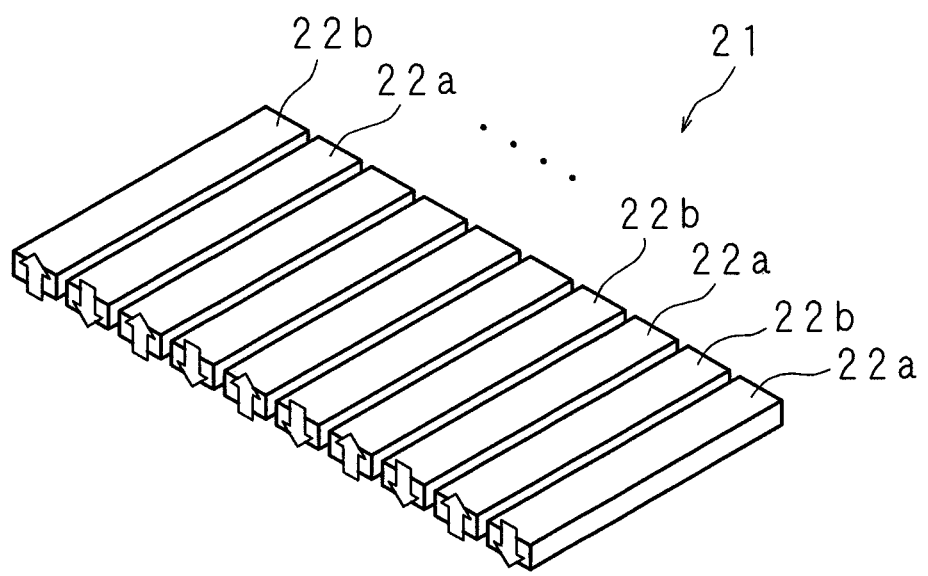
FIG. 6 is a perspective view illustrating a configuration of a mover according to a second embodiment.

FIG. 6 is a perspective view illustrating a configuration of a mover according to a second embodiment. A mover 21 of the second embodiment is configured such that two types of plate-like magnets 22*a* and 22*b* are alternately combined. In FIG. 6, open arrows indicate magnetization orientations of the individual plate-like magnets 22*a* and 22*b*. Both of the plate-like magnets 22*a* and 22*b* are magnetized in a thickness direction, but the magnetization orientations thereof are opposite to each other by 180 degrees. Note that a spacer (not shown) is inserted between the adjacent plate-like magnets 22*a* and 22*b*.

Figure 7A:
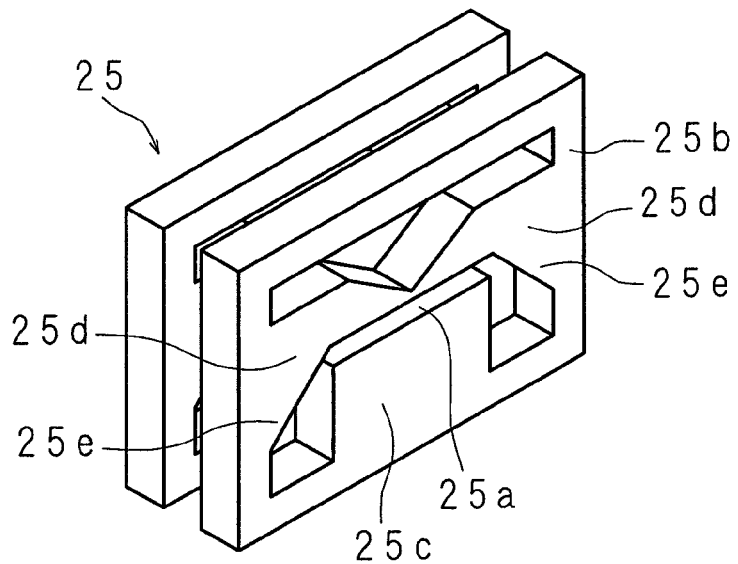
FIGS. 7A to 7D are perspective views each illustrating a configuration of an armature according to the second embodiment.
Figure 7B:
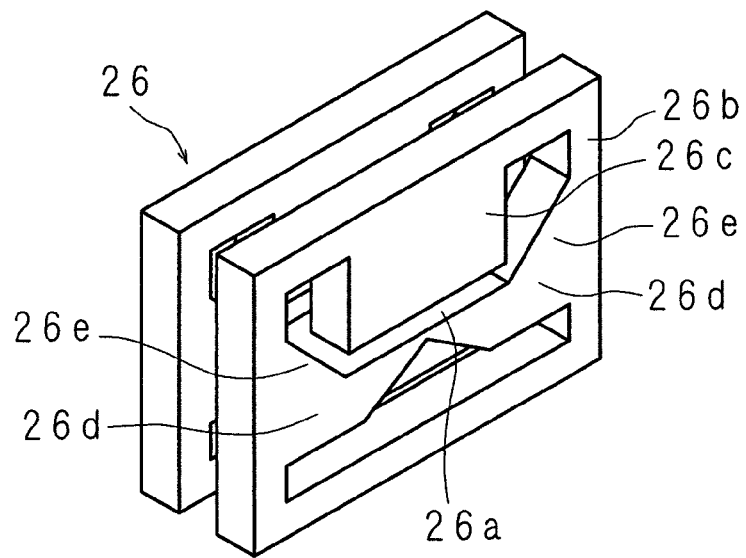
Figure 7C:
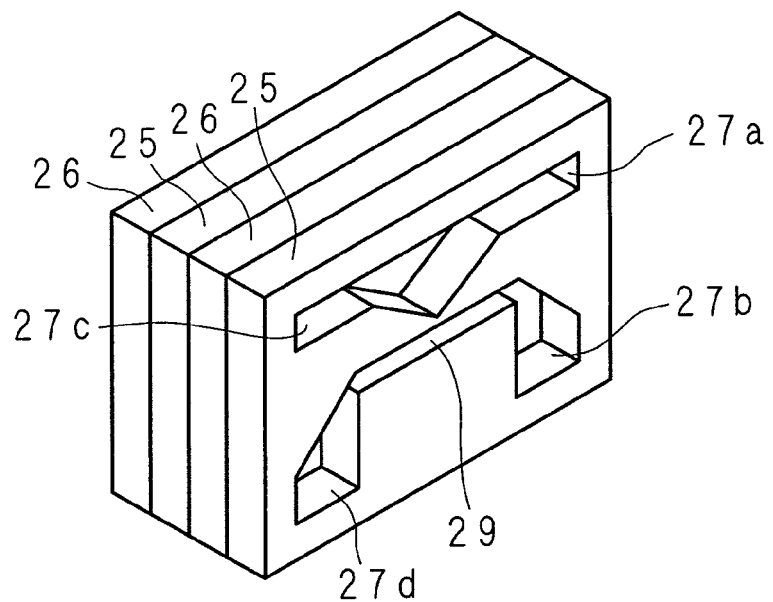
Figure 7D:
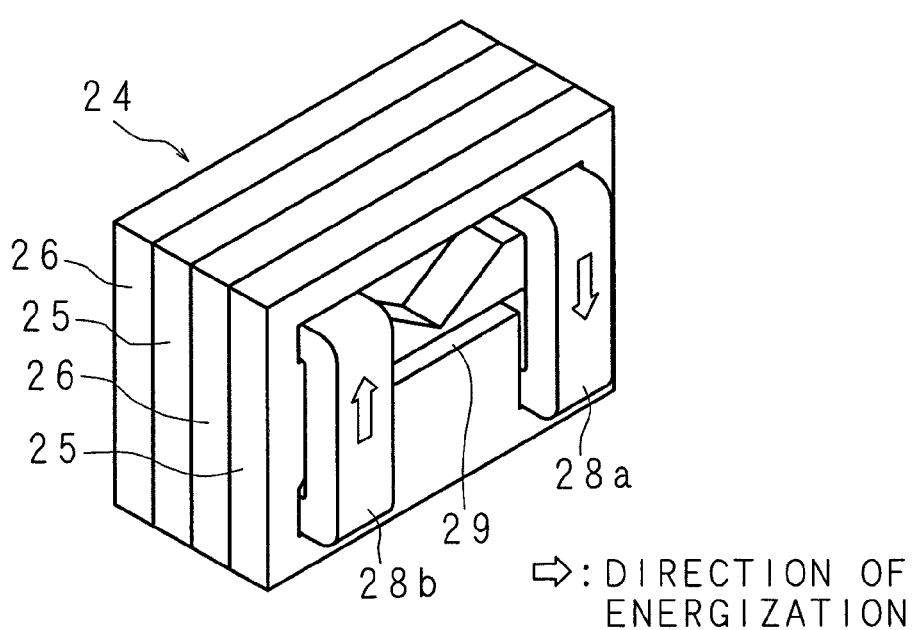

FIGS. 7A to 7D are perspective views each illustrating a configuration of an armature according to the second embodiment, in which FIGS. 7A to 7C are views illustrating partial configurations thereof, and FIG. 7D is a view illustrating an entire configuration thereof.

An armature 24 has the configuration in which a first subunit 25 illustrated in FIG. 7A and a second subunit 26 illustrated in FIG. 7B are alternately disposed (see FIG. 7C). The first subunit 25 is made of the soft magnetic material, and has an opening portion 25*a* through which the mover 21 is passed, a yoke portion 25*b* as a frame that is disposed outside the opening portion 25*a*, a first core portion 25*c* that is provided to extend from one side in the longitudinal direction of the yoke portion 25*b* in the thickness direction of the mover 21, and second core portions 25*d* and 25*d* that are provided to extend from both sides in the width direction of the yoke portion 25*b* in the width direction of the mover 21.

The first core portion 25*c* has a rectangular shape when viewed in a plane view. In each of the second core portions 25*d* and 25*d*, the base end portion on the side with the yoke portion 25*b* has a trapezoidal shape having a rib 25*e* when viewed in a plane view, the end portion on the side with the opening portion 25*a* has a tapered trapezoidal shape that becomes narrower toward the center when viewed in a plane view, and the end portions of both of the second core portions 25*d* and 25*d* are linked with each other.

The second subunit 26 is made of the soft magnetic material, and has an opening portion 26*a* through which the mover 21 is passed, a yoke portion 26*b* as a frame that is disposed outside the opening portion 26*a*, a first core portion 26*c* that is provided to extend from one side in the longitudinal direction of the yoke portion 26b in the thickness direction of the mover 21, and second core portions 26d and 26d that have ribs 26e, and are provided to extend from both sides in the width direction of the yoke portion 26b in the width direction of the mover 21.

The second subunit 26 has a configuration obtained by rotating the first subunit 25 by 180 degrees, i.e., a configuration obtained by vertically inverting the first subunit 25, and shapes of the opening portion 26a, the yoke portion 26b, the first core portion 26c, and the second core portions 26d and 26d of the second subunit 26 when viewed in a plane view correspond to shapes obtained by rotating the opening portion 25a, the yoke portion 25b, the first core portion 25c, and the second core portions 25d and 25d of the first subunit 25 by 180 degrees.

In each of the first subunit 25 and the second subunit 26, the thickness of each of the core portions is formed to be thinner than that of the yoke portion such that the core portions of the first and second subunits 25 and 26 are not brought into contact with each other when the first and second subunits 25 and 26 are stacked. Subsequently, as illustrated in FIG. 7C, the first subunit 25 and the second subunit 26 are alternately disposed to be stacked. Herein, in the adjacent first and second subunits 25 and 26, although the yoke portions 25b and 26b thereof are in contact with each other, the first core portion 25 and the second core portions 25d are not in contact with the first core portion 26c and the second core portions 26d, and gaps are present therebetween to avoid a magnetic short circuit.

A winding 28a is passed through gap portions 27a and 27b common to the first and second subunits 25 and 26, and is collectively wound around one second core portions 25d in the first subunits 25 and one second core portions 26d in the second subunits 26 (the second core portion 25d and the second core portion 26d on the right side in FIGS. 7A and 7B), and a winding 28b is passed through gap portions 27c and 27d common to the first and second subunits 25 and 26, and is collectively wound around the other second core portions 25d in the first subunits 25 and the other second core portions 26d in the second subunits 26 (the second core portion 25d and the second core portion 26d on the left side in FIGS. 7A and 7B). Both of the windings 28a and 28b are connected with each other such that respective directions of energization of the windings 28a and 28b become opposite to each other (see FIG. 7D). Open arrows in FIG. 7D indicate the directions of energization in the windings 28a and 28b.

Figure 8:
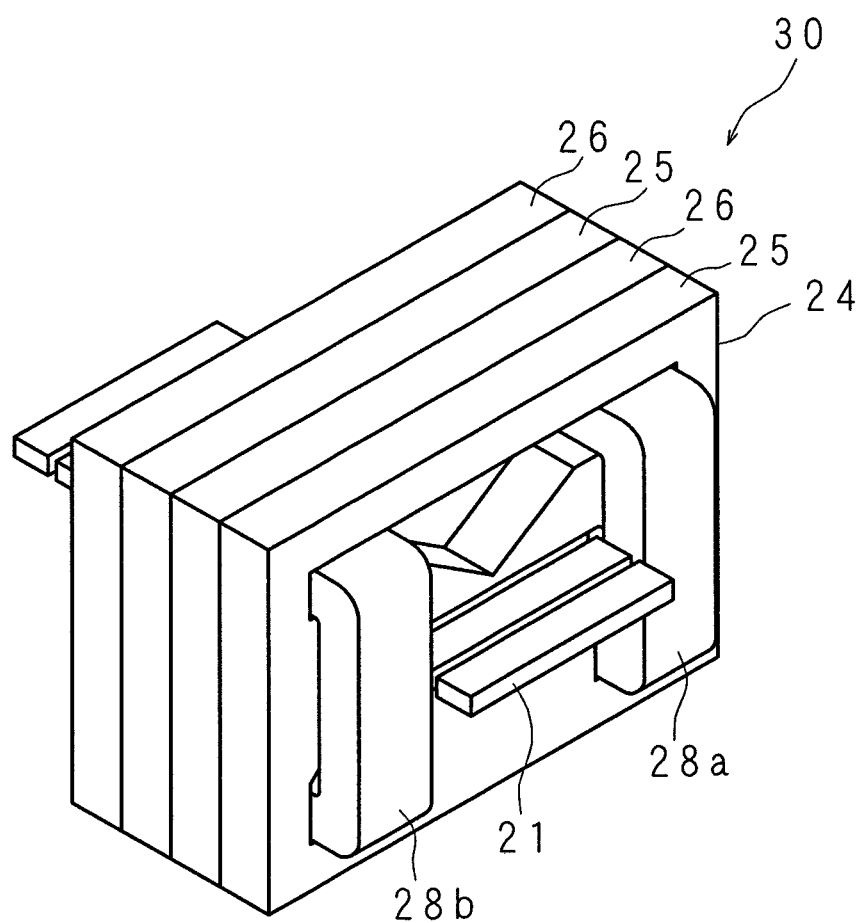
FIG. 8 is a perspective view illustrating a configuration of a linear motor according to the second embodiment.

Subsequently, the above-described mover 21 illustrated in FIG. 6 is passed through a hollow portion 29 formed by joining the opening portions 25a and 26a of the armature 24 illustrated in FIG. 7D, and a single-phase drive linear motor (a unit for a single phase) 30 according to the second embodiment is thereby constituted. FIG. 8 is a perspective view illustrating a configuration of the linear motor 30 according to the second embodiment.

In the linear motor of the second embodiment, the armature 24 functions as a stator. By passing current through the windings 28a and 28b in opposite directions, the mover 21 passed through the hollow portion 29 of the armature 24 performs the reciprocating linear movement with respect to the armature 24 (stator).

Figure 9A:
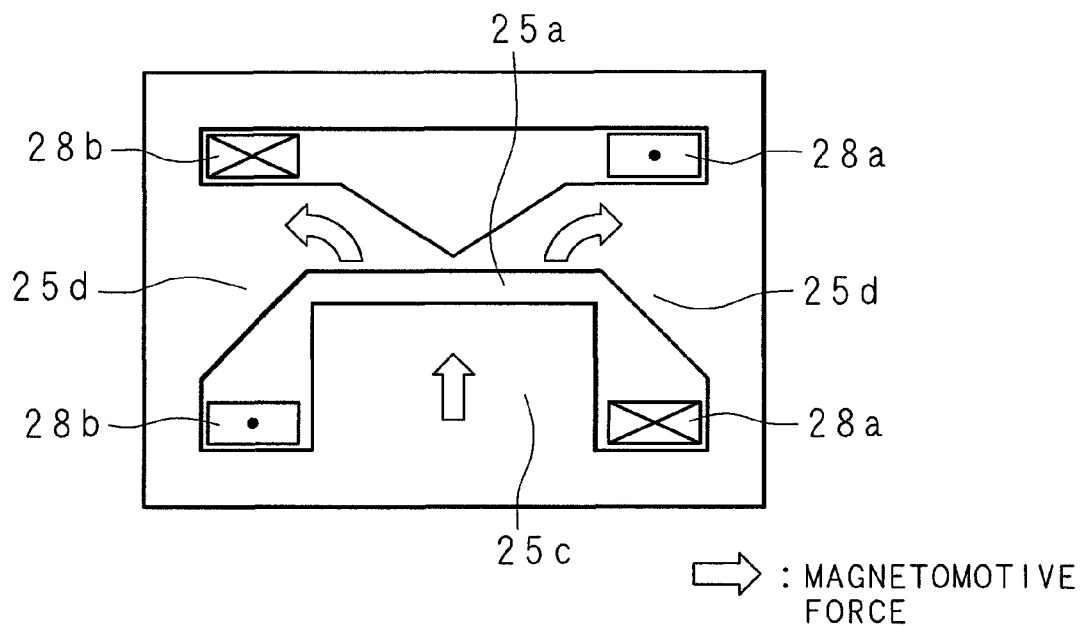
FIGS. 9A and 9B are cross-sectional views each illustrating the flow of the current and the magnetomotive force in the armature according to the second embodiment.
Figure 9B:
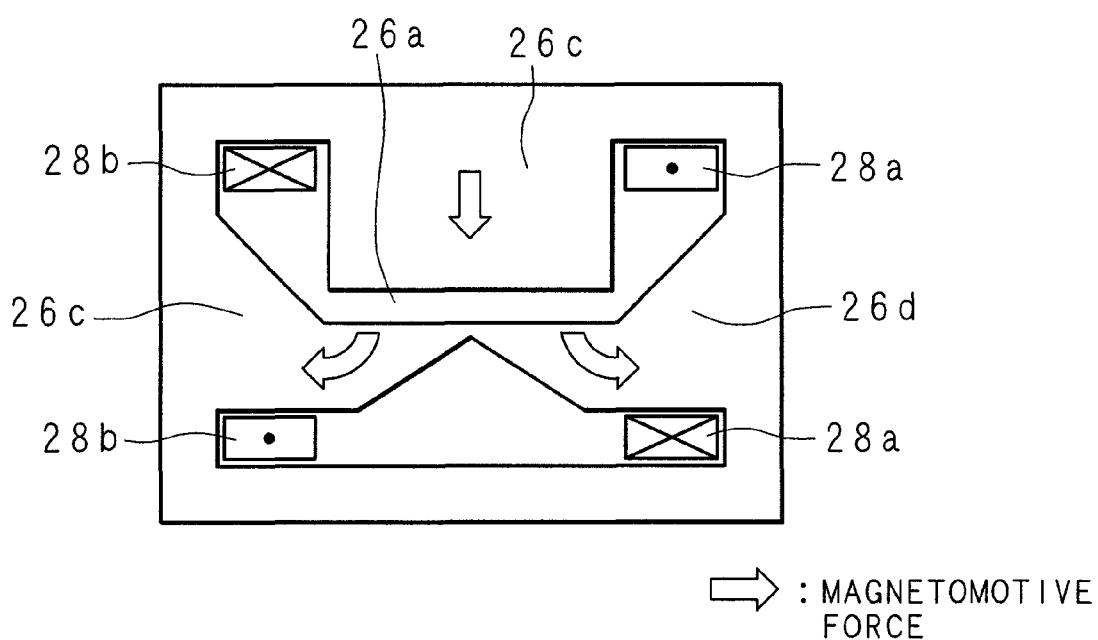

FIGS. 9A and 9B are cross-sectional views illustrating the flow of the current and the magnetomotive force in the armature 24 (the first subunit 25 and the second subunit 26) of the second embodiment. In FIGS. 9A and 9B, "● (direction of applied current from the back side to the front side of the paper sheet)" and "× (direction of applied current from the front side to the back side of the paper sheet)" denote directions of current to the windings 28a and 28b, and open arrows indicate directions of the magnetomotive force applied to the first core portions 25c and 26c and the second core portions 25d and 26d by coil energization to flow the current.

In the second embodiment, as illustrated in FIGS. 9A and 9B, when current in opposite directions is passed through the windings 28a and 28b, in the first subunit 25, an magnetic field is generated upwardly in the thickness direction of the mover 21 in the opening portion 25a through which the mover 21 is passed, while in the second subunit 26, a magnetic field is generated downwardly in the thickness direction of the mover 21 in the opening portion 26a through which the mover 21 is passed. Consequently, by energizing the two windings 28a and 28b, the magnetomotive force is applied to both of the first and second subunits 25 and 26 so that it is possible to simplify the winding structure.

Figure 10:
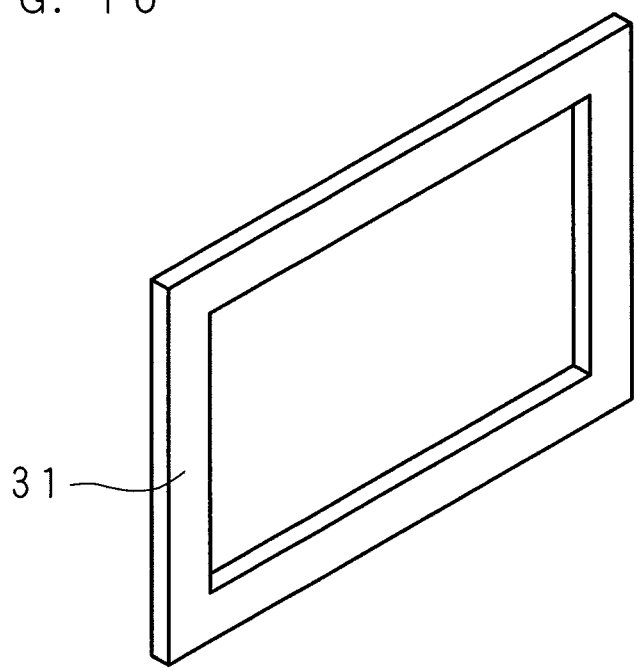
FIG. 10 is a perspective view illustrating a spacer unit used in the armature according to the second embodiment.

In the example described above, in each subunit, the thickness of each of the core portions is formed to be thinner than that of the yoke portion so that the core portions of both of the subunits are not brought into contact with each other when the subunits are stacked. However, a configuration may also be adopted in which, by inserting a spacer unit 31 consisting only of a frame-like yoke as illustrated in FIG. 10 between the adjacent subunits, the core portions of the subunits are not brought into contact with each other even when each of the subunits is formed to have a uniform thickness entirely.

In the armature 24 having this configuration, the first subunit 25, the spacer unit 31, the second subunit 26, and the spacer unit 31 are stacked in this order mentioned above continuously. In this example, since it is not necessary to make the thickness of the core portion thinner than that of the yoke portion so that an additional working process is not required, and it is possible to use the subunit having a uniform thickness entirely, it is possible to simplify production processes.

The mover in the second embodiment described above has a large amount of the magnetic flux in spite of its plate-like shape, and is light in weight. In addition, in the armature in the second embodiment, the winding structure does not become complicated even when the magnetic pole pitch is small, and the magnetic saturation is unlikely to occur. Further, since the linear motor in the second embodiment has the structure in which the magnetic saturation is unlikely to occur, the linear motor is capable of realizing high-speed response, and enhancing the conversion efficiency of the motor to achieve a reduction in size and an increase in output.

The purpose of forming each of the second core portions 25d of the first subunit 25 and each of the second core portions 26d of the second subunit 26 in the second embodiment into the tapered shape is to reduce an area of a portion where the second core portions 25d of the first subunit 25 and the first core portion 26c of the second subunit 26 oppose each other, and a portion where the second core portions 26d of the second subunit 26 and the first core portion 25c of the first subunit 25 oppose each other. The leakage flux (total magnetic flux) that occurs in air space and does not contribute to the output is proportional to the area of the portions where the core portions oppose each other, and hence the area of the opposing portions described above is reduced in order to reduce the leakage (transition) of the magnetic flux from the first core portions 25c and 26c to the second core portions 25d and 26d.

On the other hand, the ribs 25e and 26e are provided in the base end portions of the second core portions 25d and 26d on the sides with the yoke portions 25b and 26b. This is because, when the widths of these portions are narrow, the paths for the magnetic fluxes traveling from the first core portions 25c and 26c toward the yoke portions 25b and 26b become narrow so that the magnetic saturation is likely to occur. In the second embodiment, the ribs 25e and 26e are provided to suppress the occurrence of the magnetic saturation in the portions.

Although the linearly tapered shape is formed in the example illustrated in the drawings, the tapered shape to be formed may also be curvilinear. In addition, although each of shapes of gap portions (notch portions) in the first and second subunits 25 and 26 when viewed in a plane view is formed into the V shape as illustrated in FIGS. 7A and 7B, the shape may also be other shapes such as the U shape and the like. Further, the shapes of the ribs 25e and 26e are not limited to those illustrated in the drawings.

In the above-described second embodiment, although the windings 28a and 28b are collectively wound around the second core portions 25d and 26d of the first and second subunits 25 and 26, the windings may also be collectively wound around the first core portions 25c of the first subunits 25 and the first core portions 26c of the second subunits 26. Furthermore, the windings may also be wound around both of the first core portions 25c and 26c and the second core portions 25d and 26d.

In the above-described second embodiment, although the configuration is adopted in which ten of the plate-like magnets 22a and 22b each having five units are sequentially stacked, the number of plate-like magnets is only one example, and the number of plate-like magnets may also be an arbitrary number. In addition, although the first subunit 25 and the second subunit 26 are alternately disposed to form two pairs of the first and second subunits 25 and 26, this is only one example, and the number of pairs may also be an arbitrary number.

Moreover, although the description has been given of the single-phase linear motor (the unit for the single phase), when, e.g., a three-phase drive linear motor is constituted, three of the above-described armatures may be linearly disposed at the spacing of the magnetic pole pitch×(n+⅓) or the magnetic pole pitch×(n+⅔) (wherein n is an integer), and the mover may be appropriately passed through the armatures. Note that, in this case, the integer n may be appropriately set in consideration of the space for accommodating the windings.

Third Embodiment

Figure 11:
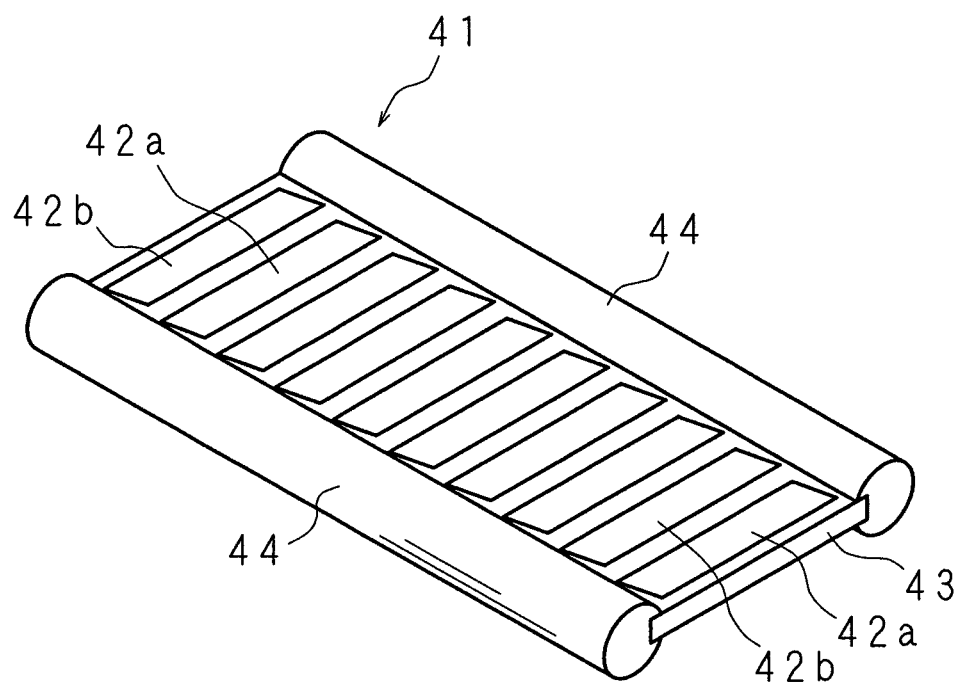
FIG. 11 is a perspective view illustrating an entire configuration of a mover according to a third embodiment.

FIG. 11 is a perspective view illustrating an entire configuration of a mover according to a third embodiment. A mover 41 of the third embodiment is configured such that two types of plate-like magnets 42a and 42b are alternately disposed in a plurality of holes in a magnet holding spacer 43 made of a non-magnetic material, and linear guide rails 44 and 44 are provided on both sides in a width direction of the magnet holding spacer 43.

Figure 12A:
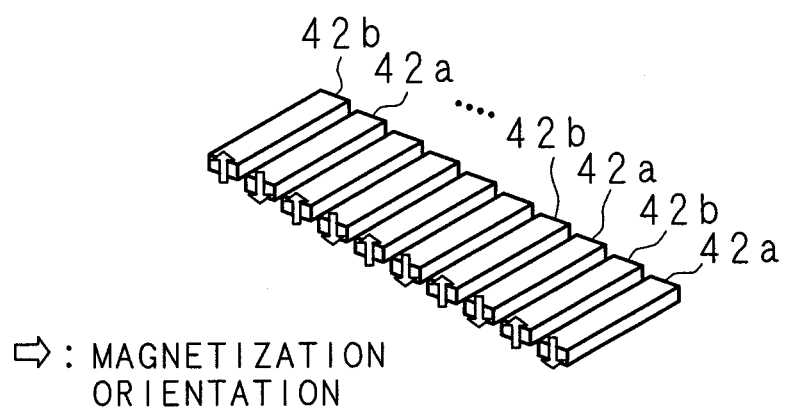
FIGS. 12A to 12D are perspective views illustrating partial configurations of the mover according to the third embodiment.

FIGS. 12A to 12D are perspective views each illustrating a partial configuration of the mover 41. FIG. 12A illustrates an example of disposition of the two types of plate-like magnets 42a and 42b, and open arrows indicate magnetization orientations of the individual plate-like magnets 42a and 42b. Both of the plate-like magnets 42a and 42b are magnetized in a thickness direction, but the magnetization orientations thereof are opposite to each other by 180 degrees.

Figure 12B:
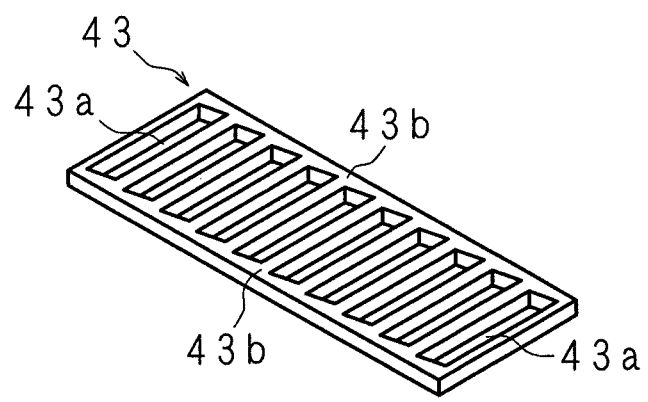

FIG. 12B illustrates the magnet holding spacer 43. The magnet holding spacer 43 has a flat rectangular shape as a whole, and a plurality of rectangular holes 43a that are long in a width direction of the magnet holding spacer 43 are parallelly arranged in a longitudinal direction of the magnet holding spacer 43. Herein, an opposing direction in which side frames 43b and 43b extending in the longitudinal direction on both sides in the width direction of the magnet holding spacer 43 oppose each other does not corresponds to the longitudinal direction of each of the holes 43a, and is displaced by several degrees. The depth of the hole 43a is equal to the thickness of each of the plate-like magnets 42a and 42b, and the number of holes 43a is equal to the total number of plate-like magnets 42a and 42b.

Figure 12C:
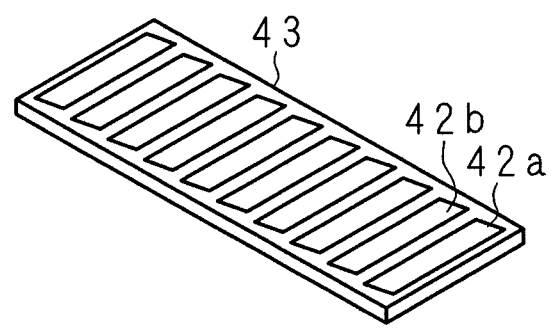

An adhesive is applied onto wall surfaces of the individual holes 43a of the magnet holding spacer 43, and then the plate-like magnets 42a and 42b are alternately fitted into the holes 43 to be fixed by bonding (see FIG. 12C). Besides the method described above, there may also be adopted a method in which the plate-like magnets 42a and 42b are alternately disposed in the holes 43a, and then the adhesive is injected into the locations of the disposition using a syringe to fix the plate-like magnets 42a and 42b by bonding.

Figure 12D:
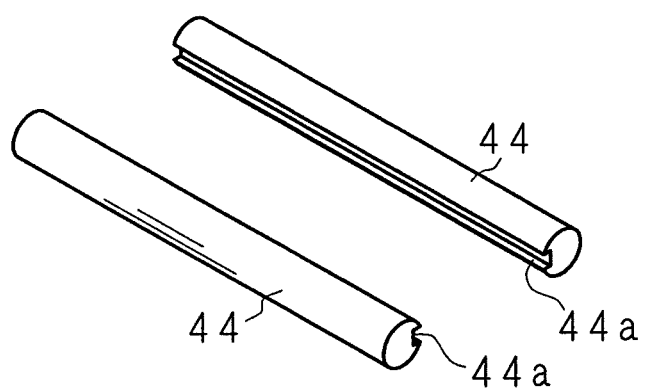

FIG. 12D illustrates the linear guide rails 44 and 44. Each of the linear guide rails 44 and 44 has a long cylindrical shape as a whole, and a notch 44a is formed in a part of its circumferential surface over the entire portion in a longitudinal direction. The side frames 43b and 43b of the magnet holding spacer 43 in which the plate-like magnets 42a and 42b are fitted are fitted into the notches 44a and 44a of both of the linear guide rails 44 and 44, whereby the mover 41 illustrated in FIG. 11 is produced.

It is to be noted that, after the side frames 43b and 43b of the magnet holding spacer 43 are fitted into the notches 44a and 44a of the linear guide rails 44 and 44 (see FIG. 13), the plate-like magnets 42a and 42b may also be alternately fixed to the holes 43a by bonding.

Figure 14A:
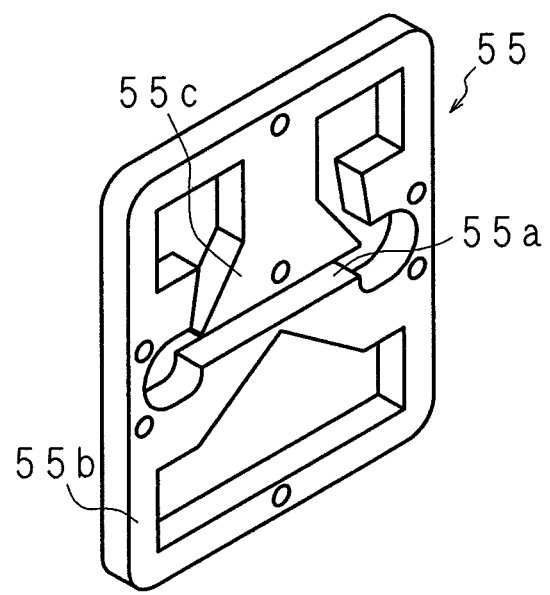
Figure 14B:
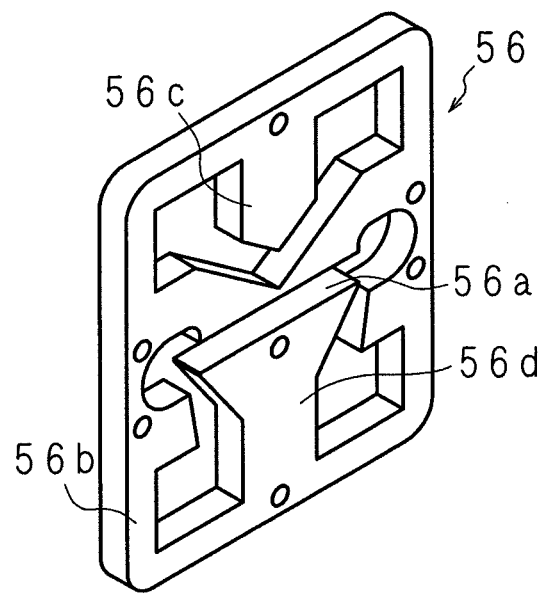
Figure 14E:
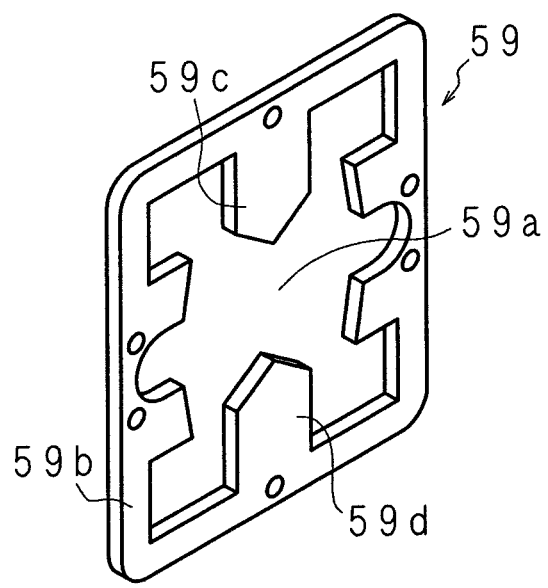
Figure 15A:
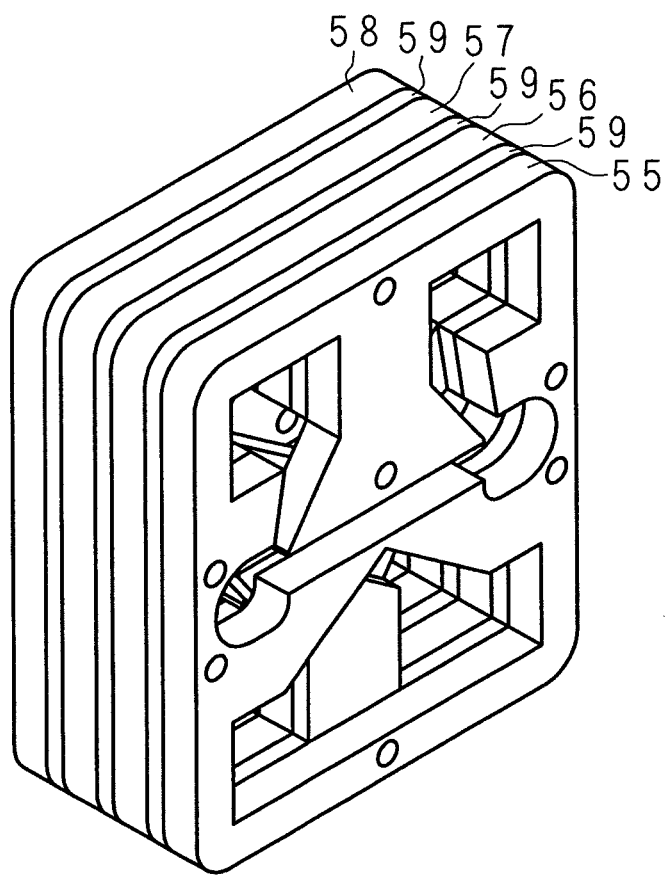

FIGS. 14A to 14E and FIGS. 15A and 15B are views each illustrating a configuration of an armature according to the third embodiment, in which FIGS. 14A to 14E are views illustrating configurations of first to fourth subunits and a spacer unit to be used in an armature 54 of the third embodiment, FIG. 15A is a view of a partial configuration of the armature 54, and FIG. 15B is a view of an entire configuration of the armature 54.

A first subunit 55 illustrated in FIG. 14A is made of the soft magnetic material, and has an opening portion 55a through which the mover 41 is passed, a yoke portion 55b as a frame that is disposed outside the opening portion 55a, and a core portion 55c that is provided to extend from the yoke portion 55b on one side in the thickness direction of the mover 41. In the core portion 55c, a base end portion on the side with the yoke portion 55b has a rectangular shape when viewed in a plane view, and an end portion on the side with the opening portion 55a has a trapezoidal shape that becomes wider toward the center when viewed in a plane view.

A second subunit 56 illustrated in FIG. 14B is made of the soft magnetic material, and has an opening portion 56a through which the mover 41 is passed, a yoke portion 56b as a frame that is disposed outside the opening portion 56a, an auxiliary core portion 56c that is provided to extend from the yoke portion 56b on one side in the thickness direction of the mover 41, and a core portion 56d that is provided to extend from the yoke portion 56b on the other side in the thickness direction of the mover 41. The core portion 56d has the same shape as that of the core portion 55c described above, a base end portion thereof on the side with the yoke portion 56b has a rectangular shape when viewed in a plane view, and an end portion thereof on the side with the opening portion 56a has a trapezoidal shape that becomes wider toward the center when viewed in a plane view. The auxiliary core portion 56c is shorter than the core portion 56d, a base end portion thereof on the side with the yoke portion 56b has a rectangular shape when viewed in a plane view, and an end portion thereof on the side with the opening portion 56a has a triangular shape that becomes narrower toward the center when viewed in a plane view.

A third subunit 57 illustrated in FIG. 14C is made of the soft magnetic material, and has an opening portion 57a through which the mover 41 is passed, a yoke portion 57b as a frame that is disposed outside the opening portion 57a, a core portion 57c that is provided to extend from the yoke portion 57b on one side in the thickness direction of the mover 41, and an auxiliary core portion 57d that is provided to extend from the yoke portion 57b on the other side in the thickness direction of the mover 41. The core portion 57c has the same shape as that of the core portion 55c described above, a base end portion thereof on the side with the yoke portion 57b has a rectangular shape when viewed in a plane view, and an end portion thereof on the side with the opening portion 57a has a trapezoidal shape that becomes wider toward the center when viewed in a plane view. The auxiliary core portion 57d is shorter than the core portion 57c, a base end portion thereof on the side with the yoke portion 57b has a rectangular shape when viewed in a plane view, and an end portion thereof on the side with the opening portion 57a has a triangular shape that becomes narrower toward the center when viewed in a plane view. The third subunit 57 has a configuration obtained by rotating the second subunit 56 by 180 degrees.

A fourth subunit 58 illustrated in FIG. 14D is made of the soft magnetic material, and has an opening portion 58a through which the mover 41 is passed, a yoke portion 58b as a frame that is disposed outside the opening portion 58a, and a core portion 58c that is provided to extend from the yoke portion 58b on the other side in the thickness direction of the mover 41. The core portion 58c has the same shape as that of the core portion 55c described above, a base end portion thereof on the side with the yoke portion 58b has a rectangular shape when viewed in a plane view, and an end portion thereof on the side with the opening portion 58a has a trapezoidal shape that becomes wider toward the center when viewed in a plane view. The fourth subunit 58 has a configuration obtained by rotating the first subunit 55 by 180 degrees.

A spacer unit 59 illustrated in FIG. 14E is made of the soft magnetic material, and has an opening portion 59a through which the mover 41 is passed, a yoke portion 59b as a frame that is disposed outside the opening portion 59a, and auxiliary core portions 59c and 59d that are provided to extend from the yoke portion 59b on both sides in the thickness direction of the mover 41. The auxiliary core portions 59c and 59d have the same shapes as those of the auxiliary core portions 56c and 57d described above, base end portions thereof on the side with the yoke portion 59b have rectangular shapes when viewed in a plane view, and end portions thereof on the side with the opening portion 59a have triangular shapes that become narrower toward the center when viewed in a plane view.

The armature 54 according to the third embodiment has a configuration in which the first subunit 55, the spacer unit 59, the second subunit 56, the spacer unit 59, the third subunit 57, the spacer unit 59, and the fourth subunit 58 are stacked in this order (see FIG. 15A).

A winding 60a is collectively wound around the core portion 55c of the first subunit 55, the auxiliary core portion 56c of the second subunit 56, the core portion 57c of the third subunit 57, and the auxiliary core portion 59c on one side in the thickness direction of the mover 41 of the spacer unit 59, and a winding 60b is collectively wound around the core portion 56d of the second subunit 56, the auxiliary core portion 57d of the third subunit 57, the core portion 58c of the fourth subunit 58, and the auxiliary core portion 59d on the other side in the thickness direction of the mover 41 of the spacer unit 59, whereby the armature 54 is constituted (see FIG. 15B). Both of the windings 60a and 60b are connected with each other such that respective directions of energization of the windings 60a and 60b are opposite to each other. Open arrows in FIG. 15B indicate the directions of energization in the windings 60a and 60b.

Figure 16:
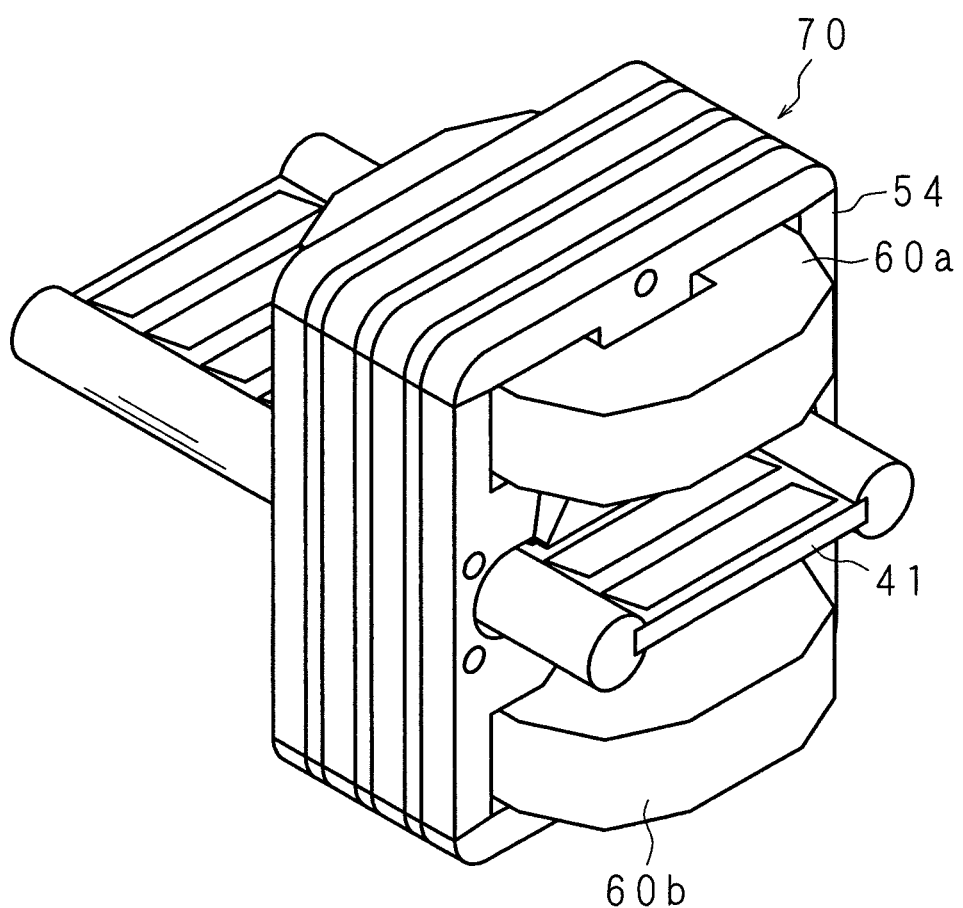
FIG. 16 is a perspective view illustrating a configuration of a linear motor according to the third embodiment.

Subsequently, by passing the mover 41 illustrated in FIG. 11 described above through a hollow portion 61 formed by joining the opening portions of the individual units of the armature 54 illustrated in FIG. 15B, a single-phase drive linear motor (a unit for a single phase) 70 according to the third embodiment is constituted. FIG. 16 is a perspective view illustrating the configuration of the linear motor 70 according to the third embodiment.

In the linear motor 70 of the third embodiment, the armature 54 functions as a stator. Subsequently, by passing current through the windings 60a and 60b in opposite directions, the mover 41 passed through the hollow portion 61 of the armature 54 performs the reciprocating linear movement with respect to the armature 54 (stator).

In the linear motor 70 (mover 41) of the third embodiment, the magnet holding spacer 43 storing the plurality of plate-like magnets 42a and 42b is pressed and supported by the linear guide rails 44 made of magnetic material in a lateral direction. Consequently, it is possible to impart high mechanical strength to the mover 41 to enhance rigidity. In general, magnetic materials have weak bending strength so that a vibration such as a flexural vibration or a resonant vibration is likely to occur. However, in the third embodiment, since the linear guide rails 44 are provided, it is possible to suppress the vibration such as the flexural vibration or the resonant vibration even when a stroke is increased. Accordingly, a large vibration does not occur even during high-speed movement so that it is possible to realize stable high-speed linear movement without the vibration.

By the way, when the magnetic material is used as the material for the linear guide rails 44, there is apprehension that the magnetic flux is leaked by the magnetic material, and the thrust force of the linear motor is thereby reduced. However, in the third embodiment, this apprehension is resolved because of the following reason. In the armature 54 of the third embodiment, since the above-described core configuration is provided, the surrounding portions of the individual linear guide rails 44 totally become the same magnetic polarity. Specifically, the surrounding portion of one of the linear guide rails 44 totally becomes a north pole, and the surrounding portion of the other linear guide rail also totally becomes the north pole. Consequently, there is no difference in magnetic potential in each of the linear guide rails 44, and hence there is no magnetic flux that extends through the linear guide rail 44. As a result, the magnetic flux is not leaked via the linear guide rail 44, and the thrust force is not reduced. In the third embodiment, it is possible to use magnetic materials capable of contributing to an improvement in strength such as inexpensive stainless steel and the like for the linear guide rail 44.

In addition, in the mover 41 of the third embodiment, the longitudinal direction of the plate-like magnets 42a and 42b is skewed by several degrees with respect to an opposing direction in which the linear guide rails 44 and 44 oppose each other. Accordingly, when the mover 41 is moved at a constant speed, it is possible to reduce jerky movement (cogging), and realize smooth high-speed linear movement.

In the third embodiment, since the linear guide rails 44 and 44 are passed through the armature 54, it is necessary to provide the individual subunits constituting the armature 54 with paths through which the linear guide rails 44 and 44 are passed, and an area of a side portion of each subunit having the core function is reduced as compared with that in the second embodiment. Further, when the thickness of each of the core portions around which the windings 60a and 60b are wound is thin, the magnetic saturation is likely to occur. Consequently, in the third embodiment, the configuration is adopted in which the auxiliary core portions 59c and 59d are provided in the spacer unit 59 to fill a gap between the cores of the same pole as much as possible, and a cross-sectional area of the path for the magnetic flux is thereby increased to gain the magnetic flux so that such magnetic saturation does not occur.

In the core configuration of the armature 54 of the third embodiment, since the first subunit 55 and the fourth subunit 58 each without the auxiliary core portion are disposed at both ends of the core configuration, it is possible to reduce winding space for the windings 60a and 60b. Therefore, when a three-phase configuration is adopted, it is possible to shorten the entire length thereof.

A description will be given hereinbelow of a modification of the third embodiment. In the modification, each of the first subunit 55, the second subunit 56, the third subunit 57, the fourth subunit 58, and the spacer unit 59 is divided into three members at the same positions in the thickness direction of the mover 41.

FIGS. 17A to 17E are views illustrating division patterns of the first to fourth subunits 55 to 58 and the spacer unit 59. FIGS. 17A, 17B, 17C, 17D, and 17E illustrate the division patterns of the first subunit 55, the second subunit 56, the third subunit 57, the fourth subunit 58, and the spacer unit 59, respectively. The individual units are divided at the same positions in the yoke portions.

Figure 17A:
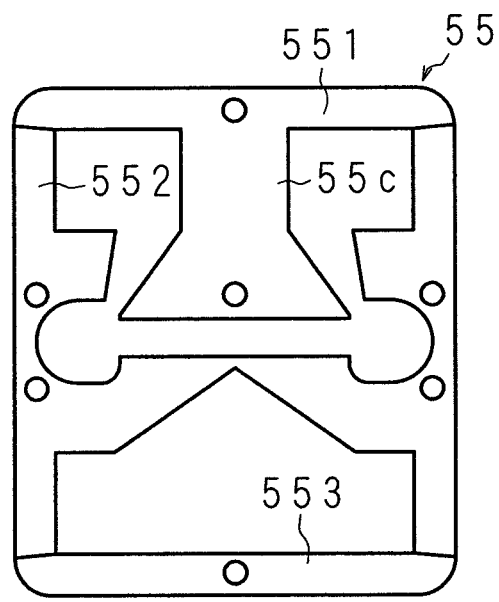
FIGS. 17A to 17E are views illustrating division patterns of first to fourth subunits and a spacer unit of an armature according to a modification of the third embodiment.
Figure 17B:
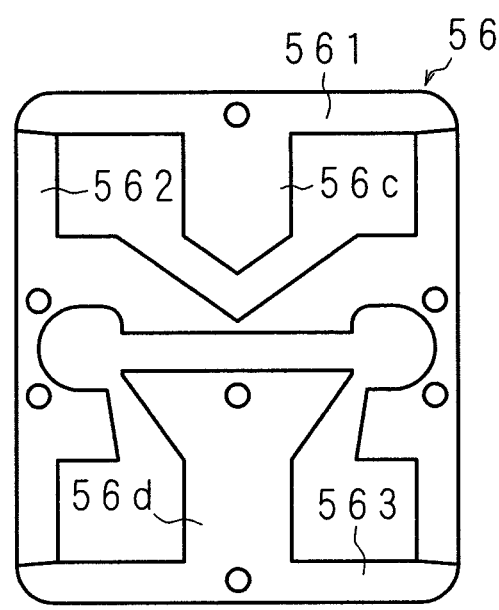
Figure 17C:
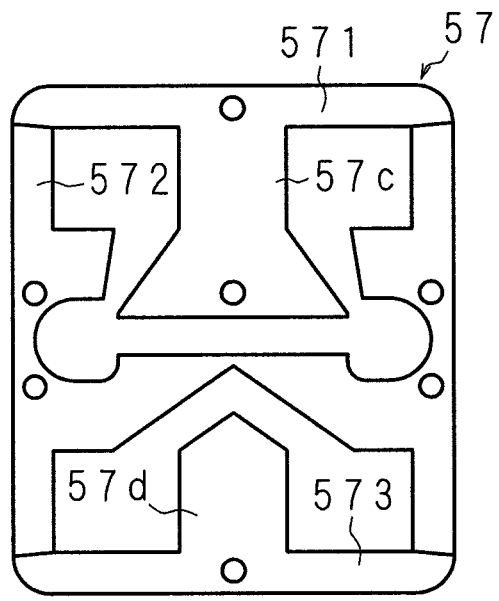
Figure 17D:
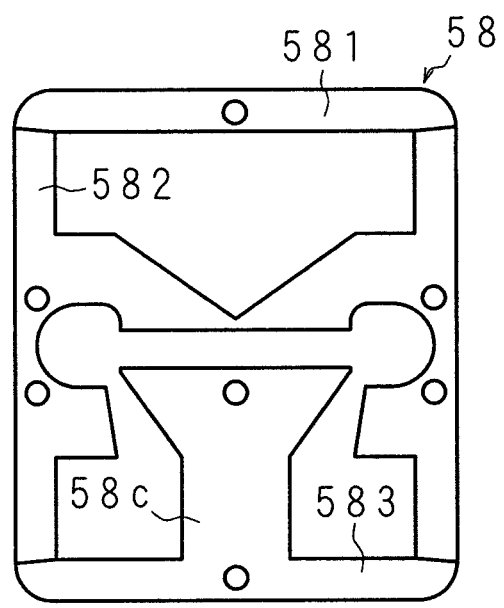
Figure 17E:
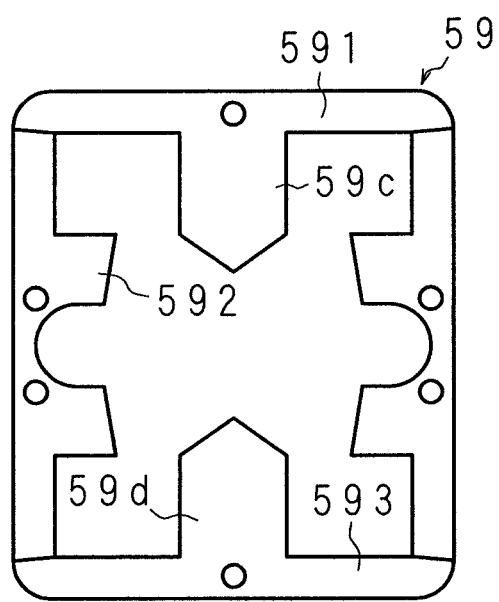

As illustrated in FIG. 17A, the first subunit 55 is divided into a first member 551 on an upper side including the core portion 55c, a second member 552 in a center, and a third member 553 on a lower side. As illustrated in FIG. 17B, the second subunit 56 is divided into a first member 561 on the upper side including the auxiliary core portion 56c, a second member 562 in the center, and a third member 563 on the lower side including the core portion 56d. As illustrated in FIG. 17C, the third subunit 57 is divided into a first member 571 on the upper side including the core portion 57c, a second member 572 in the center, and a third member 573 on the lower side including the auxiliary core portion 57d. As illustrated in FIG. 17D, the fourth subunit 58 is divided into a first member 581 on the upper side, a second member 582 in the center, and a third member 583 on the lower side including the core portion 58c. As illustrated in FIG. 17E, the spacer unit 59 is divided into a first member 591 on the upper side including the auxiliary core portion 59c, a second member 592 in the center, and a third member 593 on the lower side including the auxiliary core portion 59d.

Figure 18A:
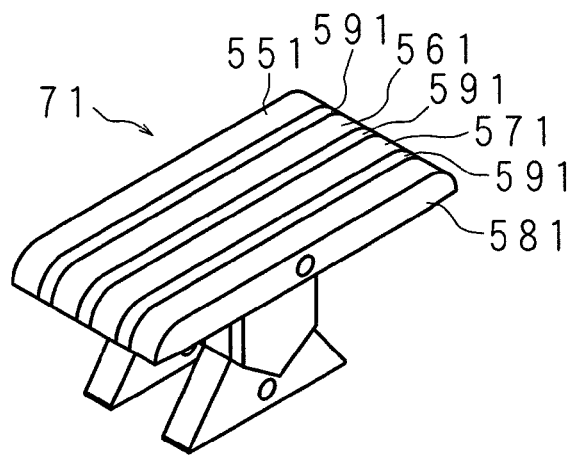
FIGS. 18A to 18C are perspective views each illustrating a configuration of the armature according to the modification of the third embodiment.

Subsequently, the first member 551 of the first subunit 55, the first member 591 of the spacer unit 59, the first member 561 of the second subunit 56, the first member 591 of the spacer unit 59, the first member 571 of the third subunit 57, the first member 591 of the spacer unit 59, and the first member 581 of the fourth subunit 58 are stacked in this order to obtain a first intermediate element 71 on the upper side as illustrated in FIG. 18A.

Figure 18B:
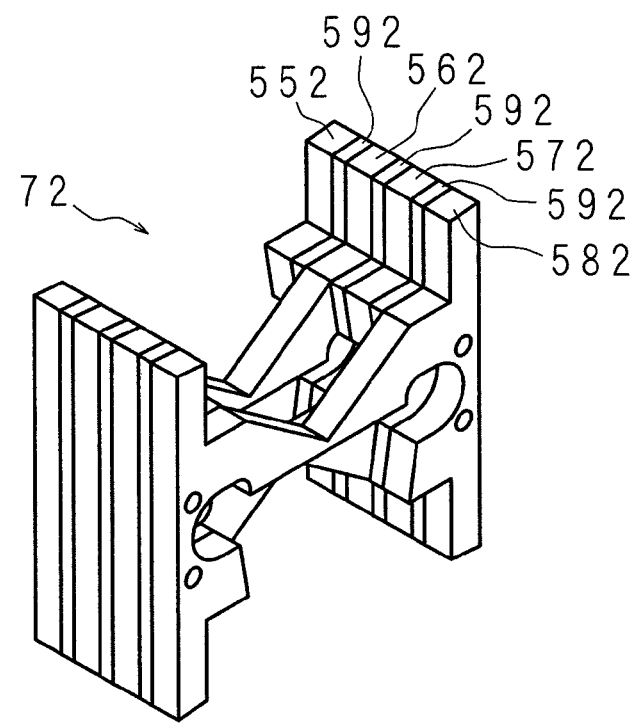

In addition, the second member 552 of the first subunit 55, the second member 592 of the spacer unit 59, the second member 562 of the second subunit 56, the second member 592 of the spacer unit 59, the second member 572 of the third subunit 57, the second member 592 of the spacer unit 59, and the second member 582 of the fourth subunit 58 are stacked in this order to obtain a second intermediate element 72 in the center as illustrated in FIG. 18B.

Figure 18C:
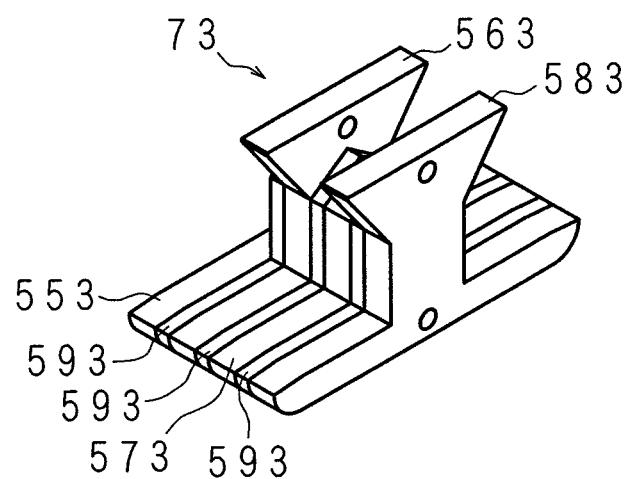

Further, the third member 553 of the first subunit 55, the third member 593 of the spacer unit 59, the third member 563 of the second subunit 56, the third member 593 of the spacer unit 59, the third member 573 of the third subunit 57, the third member 593 of the spacer unit 59, and the third member 583 of the fourth subunit 58 are stacked in this order to obtain a third intermediate element 73 on the lower side as illustrated in FIG. 18C.

Figure 19A:
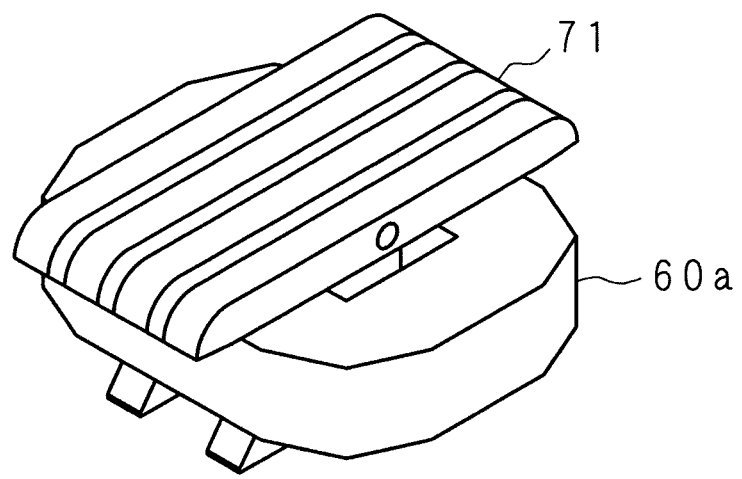
FIGS. 19A and 19B are perspective views each illustrating the configuration of the armature according to the modification of the third embodiment.
Figure 19B:
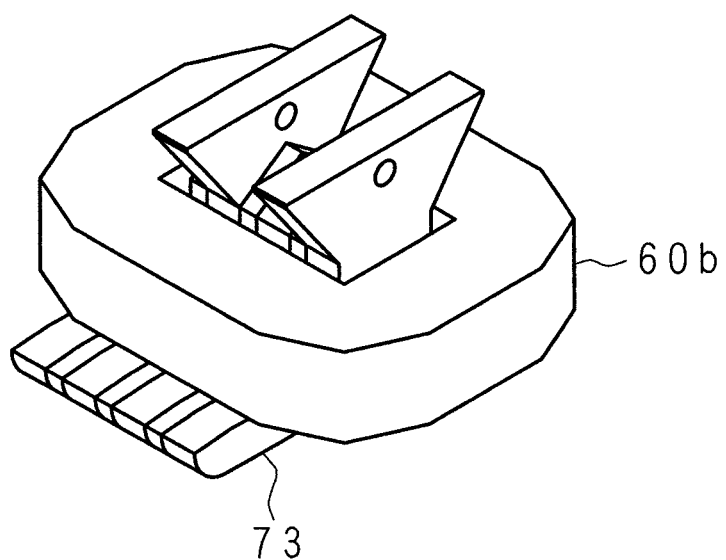

Subsequently, as illustrated in FIGS. 19A and 19B, the winding 60a is collectively wound around the core portions and the auxiliary core portions of the first intermediate element 71, and the winding 60b is collectively wound around the core portions and the auxiliary core portions of the third intermediate element 73. Thereafter, the first intermediate element 71, the second intermediate element 72, and the third intermediate element 73 are assembled to produce the armature 54 as illustrated in FIG. 15B.

In this modification, each of the first to fourth subunits 55 to 58 and the spacer unit 59 is divided. Therefore, it is possible to wind the windings 60a and 60b in the state where the subunits and the spacer unit are divided, and the winding process is easy so that it is possible to easily produce the armature 54. In the modification described above, since the magnetic potential is same, the leakage of the magnetic flux is small in quantity even when they are divided so that thrust force characteristics are not adversely affected.

Although the description has been given of the single-phase linear motor (the unit for the single phase), when, e.g., a three-phase drive linear motor is constituted, three of the above-described armatures 54 may be linearly disposed at the spacing of the magnetic pole pitch×(n+⅓) or the magnetic pole pitch×(n+⅔) (wherein n is an integer), and the mover 41 may be appropriately passed through the armatures. At this time, screws are passed through holes provided in the units of each armature 54 to couple and fix the three armatures 54. In this case, the integer n may be appropriately set in consideration of the space for accommodating the windings.

EXAMPLES

A description will be given hereinbelow of specific configurations of linear motors produced by the present inventors, and characteristics of the produced linear motors.

Example 1

Example 1 is an example corresponding to the first embodiment described above. First, as the plate-like mover 1 used in the linear motor, the mover including permanent magnets having the shape as illustrated in FIG. 1 was produced. The plate-like magnets 2a and 2b to be used were made of a Nd—Fe—B based sintered magnet, and the sintered magnet having a maximum energy product: 370 kJ/m$^3$, and a residual magnetic flux density: Br=1.4 T was cut into a shape having a length of 50 mm, a width of 4 mm, and a thickness of 6 mm. In addition, as the soft magnetic element 3 (pole piece), soft steel (made of SPCC) in a shape having a length of 50 mm, a width of 8 mm, and a thickness of 6 mm was produced by cutting.

Then, thirty-one magnets and thirty soft magnetic elements were prepared, the plate-like magnet 2a, the soft magnetic element 3, the plate-like magnet 2b, and the soft magnetic element 3 were alternately bonded together by using an epoxy adhesive in this order mentioned above continuously, and the plate-like mover 1 having a length of 364 mm, a width of 50 mm, and a thickness of 6 mm was produced. Magnetization orientations of the plate-like magnets 2a and 2b are directed toward the bonded soft magnetic elements 3, but the orientations are opposite to each other (see the open arrows in FIG. 1). The soft magnetic elements 3 were inserted between the plate-like magnets 2a and 2b such that south poles of the plate-like magnets 2a and 2b face each other, and north poles thereof face each other.

Figure 20A:
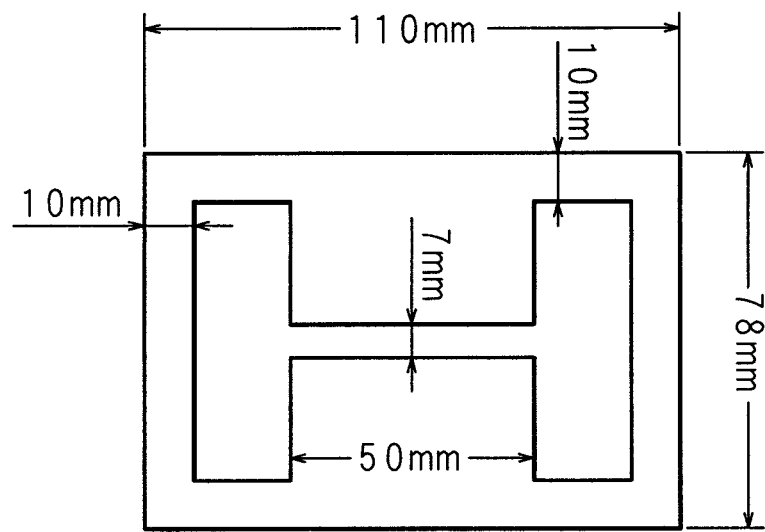
FIGS. 20A to 20C are plane views each illustrating an armature part used for producing an armature according to Example 1.
Figure 20B:
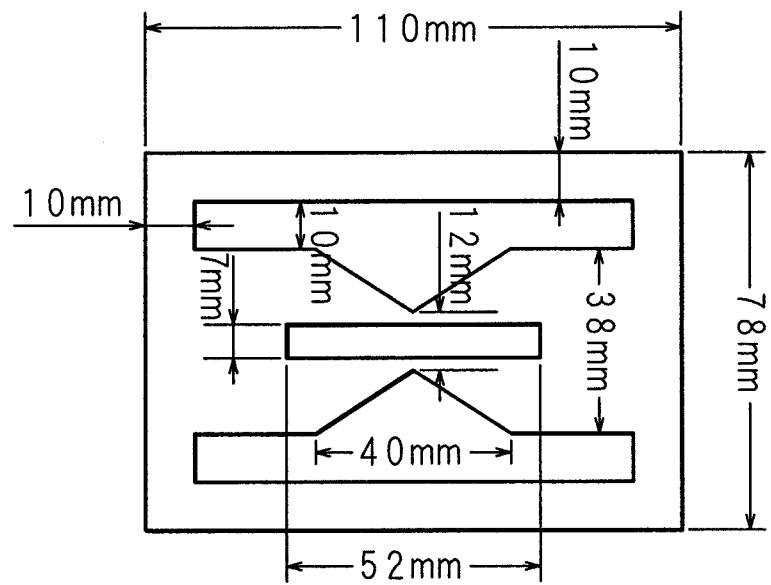
Figure 20C:
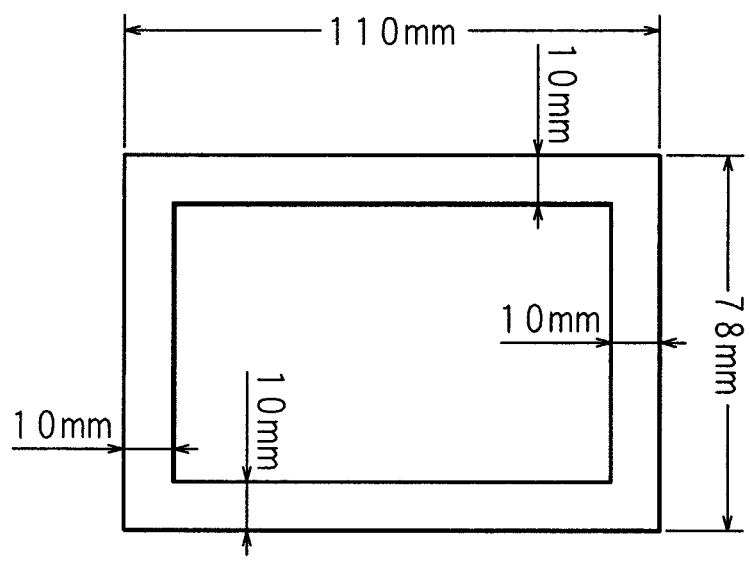

Next, the armature 4 was produced. Sixteen armature parts each having a shape illustrated in FIG. 20A were cut out from a silicon steel sheet having a thickness of 0.5 mm, and the cut-out sixteen parts were stacked and bonded together to produce the first subunit 5 having a thickness of 8 mm (see FIG. 2A). In addition, sixteen armature parts each having a shape illustrated in FIG. 20B were cut out from the silicon steel sheet having a thickness of 0.5 mm, and the cut-out sixteen parts were stacked and bonded together to produce the second subunit 6 having a thickness of 8 mm (see FIG. 2B). Further, eight armature parts each having a shape illustrated in FIG. 20C were cut out from the silicon steel sheet having a thickness of 0.5 mm, and the cut-out eight parts were stacked and bonded together to produce the spacer unit 11 having a thickness of 4 mm (see FIG. 5).

The thus-produced individual units were stacked in the order of the first subunit 5, the spacer unit 11, the second subunit 6, the spacer unit 11, the first subunit 5, the spacer unit 11, and the second subunit 6 to constitute the unit for the single phase (see FIG. 2C, note that the spacer unit 11 is not depicted). The thickness of the unit for the single phase is 44 mm. The magnetic pole pitch thereof is 12 mm (=8 mm+4 mm).

In the unit for the single phase, as the windings 8a and 8b of drive coils, a polyimide tape was wound around portions of the armature core where the windings were to be wound in order to secure insulation, and, over the polyimide tape, a magnet wire having a diameter of 1.2 mm was wound 100 turns at each of two positions while being passed through the gap portions on four corners (see FIG. 2D). Subsequently, series connection was performed such that directions of a current become opposite to each other when the unit was energized.

Figure 21A:
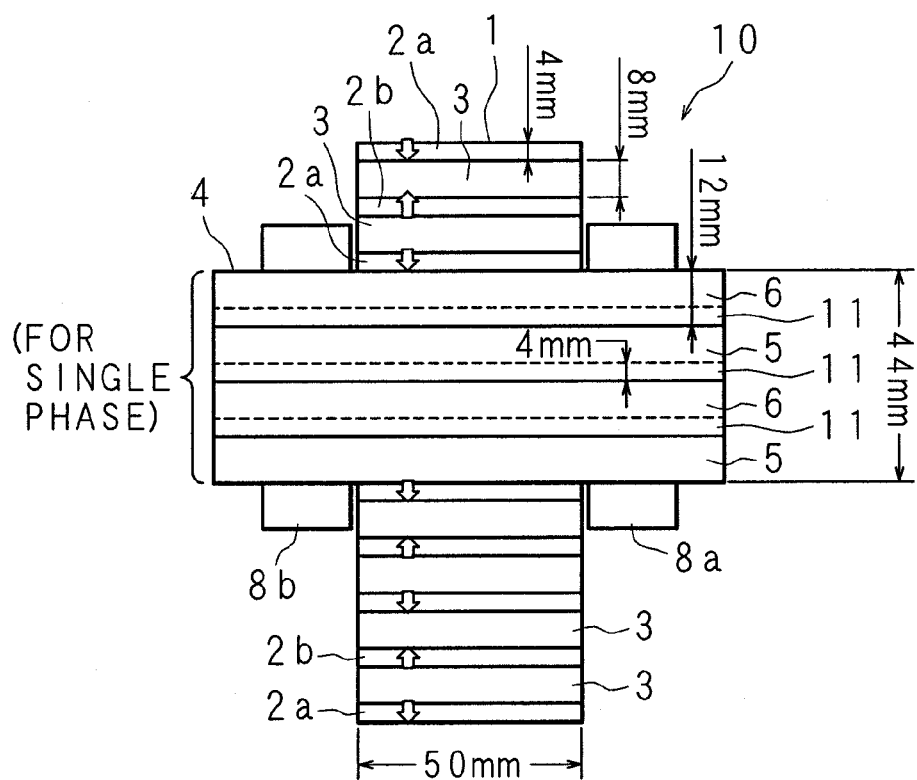
FIGS. 21A and 21B are plane views each illustrating a configuration of a linear motor according to Example 1.
Figure 21B:
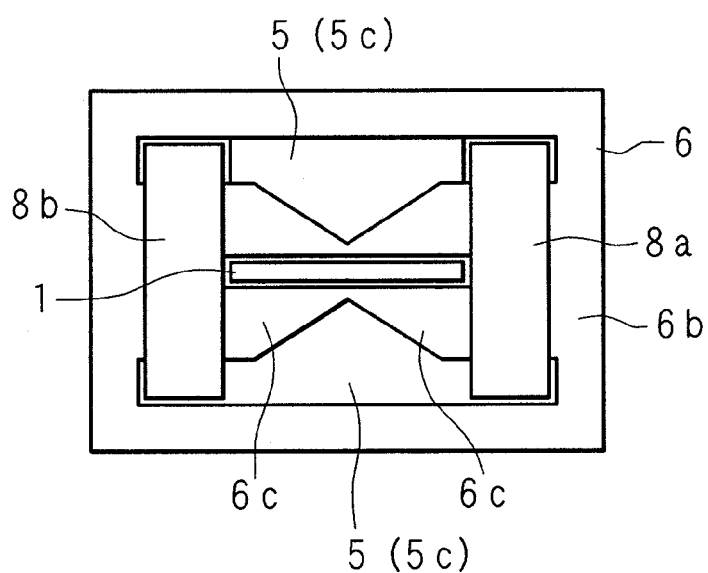

Three of the thus-produced armatures 4 were prepared, the three of the armatures 4 are linearly arranged at the spacing of 28 mm (=12 mm×(2+⅓)), the mover 1 was inserted into the hollow portion in the center (see FIG. 3), and the armatures 4 ware fixed to a test bench such that the mover 1 was movable in a longitudinal direction without contacting the armatures 4. Each of FIGS. 21A and 21B illustrates the configuration of the produced linear motor 10.

One ends of a pair of the drive coils that were wound around the three armatures 4 were connected with each other, and the other ends thereof were connected in star connection for connection with U, V, and W phases of a three-phase power source and connected with a motor controller. In addition, an optical linear scale was attached to the tip portion of the mover 1, and a linear encoder was attached on the side fixed to the test bench, whereby it became possible to read the position of the mover 1. Further, a configuration was adopted in which a positional signal detected by the linear encoder was outputted to the above-mentioned motor controller to control the position of the mover 1.

After the connections described above, the thrust force of the mover 1 was measured while changing drive current applied to the drive coils. During the measurement, the thrust force was measured by a method in which a force gauge was pressed against the mover 1. The result of the measurement is illustrated in FIG. 22. A horizontal axis in FIG. 22 denotes an rms value of the drive current×the number of turns of the coils per one phase of the armature.

As illustrated in FIG. 22, the maximum thrust force exceeded 450 N and, because the mass of the mover was 0.9 kg, a thrust force/mover mass ratio was 500 N/kg. In a conventional linear motor having the maximum thrust force of 500 N, the mass of the mover is about 2.5 kg, the thrust force/mover mass ratio thereof is about 200 N/kg. Consequently, the linear motor of the present invention is capable of reducing, when obtaining the same level of the thrust force, the mass of the mover to about ⅖ as compared with that of the conventional linear motor. Thus, in the present invention, it is possible to provide a linear motor that is extremely effective in high-speed process machine.

Example 2

Example 2 is an example corresponding to the second embodiment described above. First, the plate-like mover 21 used in the linear motor was produced in the following manner. Thirty of the plate-like magnets 22a and 22b made of a Nd×Fe×B based rare earth magnet (residual magnetic flux density: Br=1.4 T, maximum energy product: 380 kJ/m$^3$) each having a length of 50 mm, a width of 10 mm, and a thickness of 5 mm were disposed such that the magnetization orientation was alternately directed upward and downward in a thickness direction, as illustrated in FIG. 6. In addition, aluminum spacers each having a length of 50 mm, a width of 2 mm, and a thickness of 5 mm were inserted one by one between the adjacent magnets and bonded to the magnets, and the mover was thereby assembled.

The produced mover 21 is composed of thirty plate-like magnets 22a and 22b, and twenty-nine spacers (not shown), and the size thereof is 358 mm in length, 50 mm in width, and 5 mm in thickness.

Figure 23A:
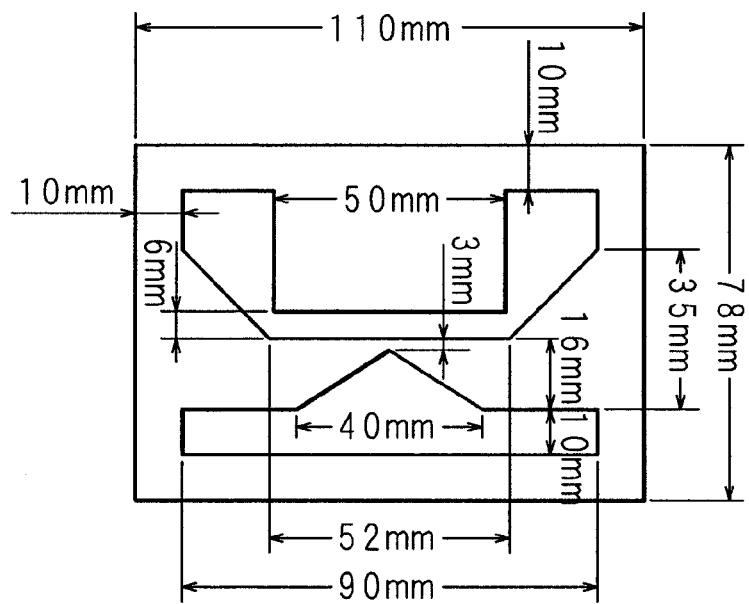
FIGS. 23A and 23B are plane views each illustrating an armature part used for producing an armature according to Example 2.
Figure 23B:
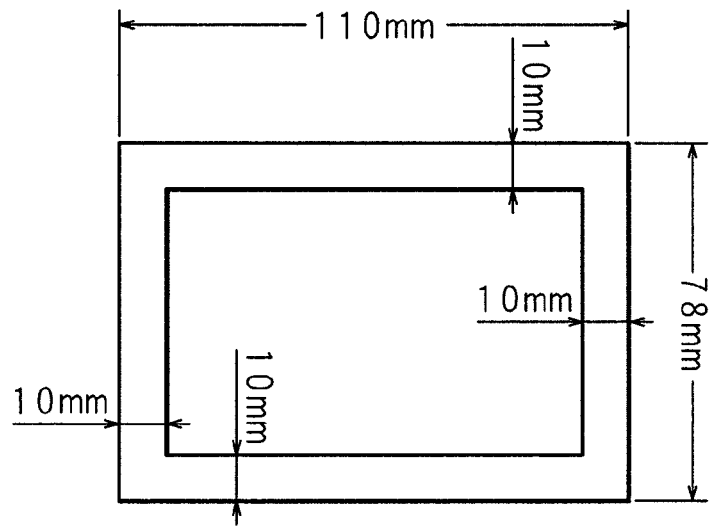

Next, the armature 24 was produced. Twenty armature parts each having a shape illustrated in FIG. 23A were cut out from the silicon steel sheet having a thickness of 0.5 mm using a wire cutting machine, and the twenty cut-out armature parts were stacked and bonded together to produce the first subunit 25 and the second subunit 26 each having a thickness of 10 mm (see FIGS. 7A and 7B). In addition, four armature parts each having a shape illustrated in FIG. 23B were cut out from the silicon steel sheet having a thickness of 0.5 mm, and the cut-out four armature parts were bonded together to produce the spacer unit 31 having a thickness of 2 mm (see FIG. 10).

The first subunit 25 and the second subunit 26 are in vertically inverted relation to one another, and a shape obtained by rotating one of them by 180 degrees corresponds to that of the other one. Consequently, unlike Example 1, it is possible to produce the first and second subunits 25 and 26 by using the same die.

The thus-produced individual units were stacked in the order of the first subunit 25, the spacer unit 31, the second subunit 26, the spacer unit 31, the first subunit 25, the spacer unit 31, and the second subunit 26 to produce the unit for the single phase (see FIG. 7C, note that the spacer unit 31 is not shown). The thickness of the unit for the single phase is 46 mm. The magnetic pole pitch thereof is 12 mm (=10 mm+2 mm).

In the unit for the single phase, as the windings 28a and 28b of the drive coils, a magnet wire having a diameter of 1.2 mm around which a polyimide tape was wound for securing insulation was wound 100 turns at each of two positions, while being passed through the gap portions on four corners (see FIG. 7D). Subsequently, series connection was performed such that directions of the current become opposite to each other when the unit for the single phase was energized.

Figure 24:
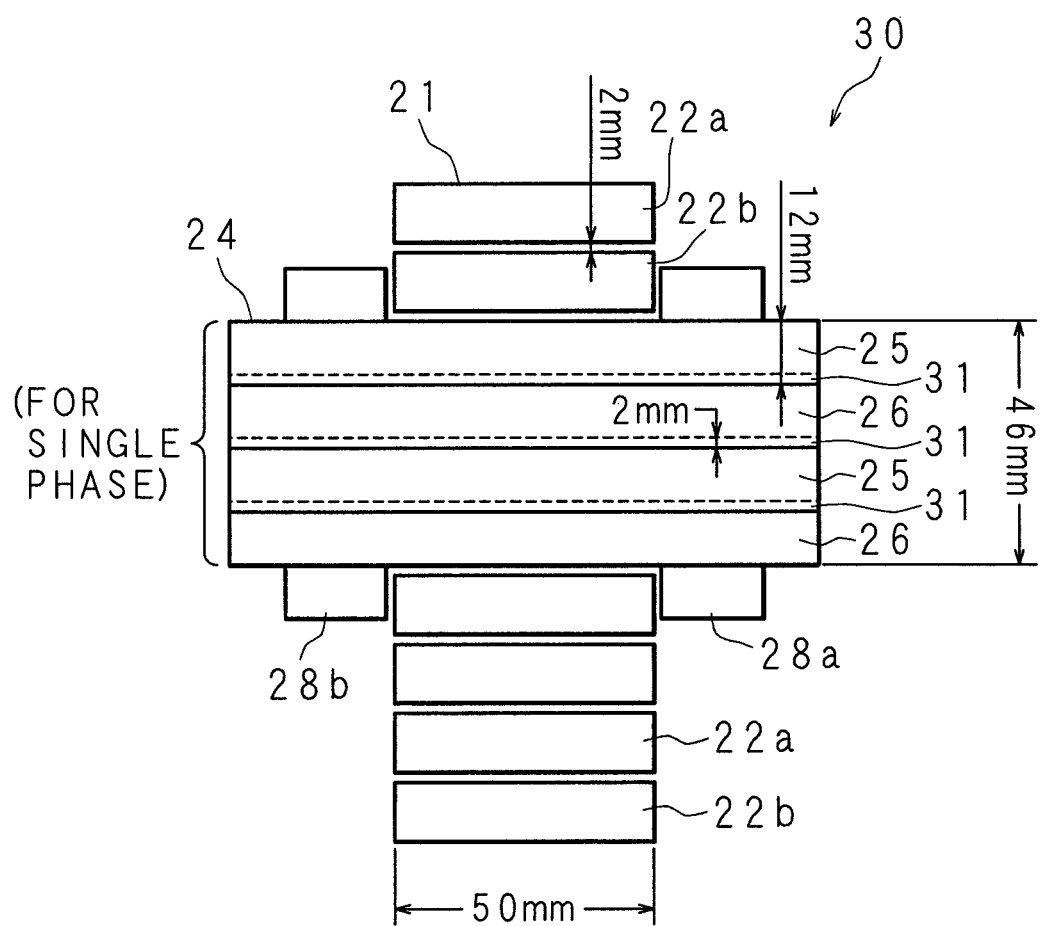
FIG. 24 is a plane view illustrating a configuration of a linear motor according to Example 2.

Three of the thus-produced armatures 24 were prepared, the three armatures 24 were linearly arranged at the spacing of 28 mm (=12 mm×(2+⅓)), the mover 21 was inserted into the hollow portion in the center (see FIG. 8), and the armatures 24 were fixed to the test bench such that the mover 21 was movable in the longitudinal direction without contacting the armatures 24. FIG. 24 illustrates the configuration of the produced linear motor 30.

One ends of a pair of the drive coils that were wound around the three armatures 24 were connected with each other, and the other ends thereof were connected in star connection for connection with U, V, and W phases of the three-phase power source and connected with the motor controller. In addition, the optical linear scale was attached to the tip portion of the mover 21, and the linear encoder was attached on the side fixed to the test bench, whereby it became possible to read the position of the mover 21. Further, the configuration was adopted in which the positional signal detected by the linear encoder was outputted to the above-mentioned motor controller to control the position of the mover 21.

After the connections described above, the thrust force of the mover 21 was measured while changing the drive current applied to the drive coils. During the measurement, the thrust force was measured by the method in which the force gauge was pressed against the mover 21. The result of the measurement is illustrated in FIG. 25. The horizontal axis in FIG. 25 denotes the rms value of the drive current×the number of turns of the coils per one phase of the armature.

As illustrated in FIG. 25, the maximum thrust force of 750 N was achieved and, because the mass of the mover was 0.7 kg, the thrust force/mover mass ratio was 1070 N/kg. The linear motor 30 obtains the thrust force/mover mass ratio that is more than five times as high as that of a conventional linear motor that has the thrust force/mover mass ratio of about 200 N/kg. Consequently, the linear motor of the present invention is capable of reducing, when obtaining the same level of the thrust force, the mass of the mover to about ⅕ as compared with that of the conventional linear motor. Thus, in the present invention, it is possible to provide a linear motor that is extremely effective in high-speed process in a finishing machine or the like.

In Example 2, the thrust force larger than that in Example 1 is obtained. However, in Example 1 (the first embodiment), it is possible to achieve a reduction in thickness as compared with Example 2 (the second embodiment). Therefore, either one of the configurations may be appropriately selected in accordance with the use and the purpose of use of the linear motor.

Example 3

Example 3 is an Example Corresponding to the Modification of the third embodiment described above. First, the plate-like mover 41 used in the linear motor was produced in the following manner. Ten of the plate-like magnets 42a and 42b made of the Nd—Fe—B based rare earth magnet (residual magnetic flux density: Br=1.39 T) each having a length of 38 mm, a width of 8 mm, and a thickness of 4.5 mm were disposed in the holes 43a of the magnet holding spacer 43, and fixed by bonding such that the magnetization orientation was alternately directed upward and downward in the thickness direction, as illustrated in FIG. 12. A skew angle of the plate-like magnets 42a and 42b was set to 8°. Subsequently, the side frames 43a and 43b of the magnet holding spacer 43 were fitted in the notches 44a and 44a of the cylindrical linear guide rails 44 and 44 each having a diameter of 12 mm that were made of SUS430 to produce the mover 41.

Figure 26:
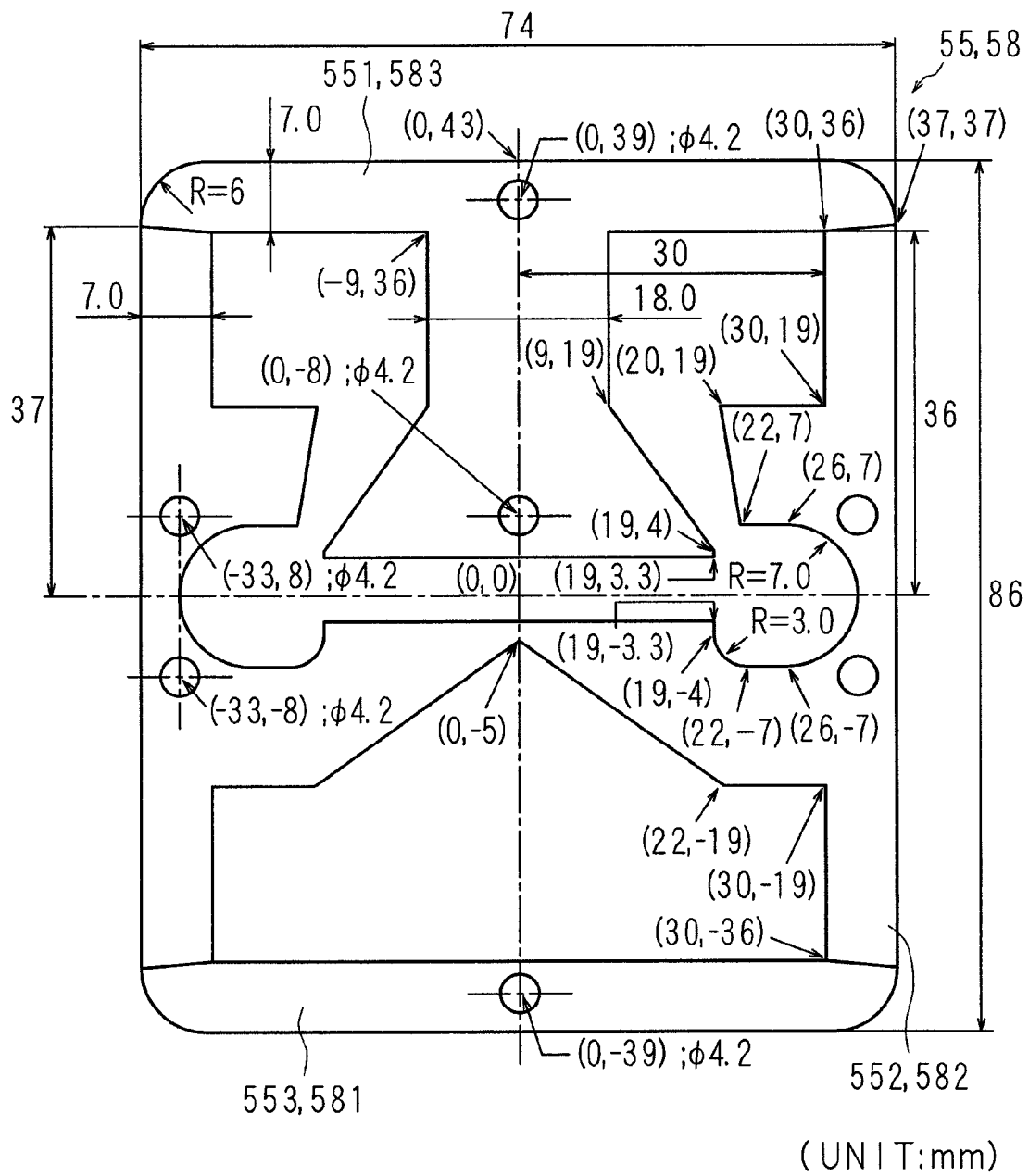
FIG. 26 is a plane view illustrating an armature part used for producing an armature according to Example 3.

Next, the armature 54 was produced. After sixteen armature parts each having a plane shape as illustrated in FIG. 14A or 14D were cut out from the silicon steel sheet having a thickness of 0.5 mm using the wire cutting machine, and the cut-out sixteen parts were stacked and bonded together (thickness of 8 mm), the bonded parts were divided into three members to obtain three types of separated members in the first subunit 55 and the fourth subunit 58 (see FIGS. 17A and 17D). Examples of specific dimensions and shapes are illustrated in FIG. 26. (x, y) in FIG. 26 denotes a coordinate position of each point (unit of length: mm) when coordinates in the center are assumed to be (0, 0). As described above, the first and fourth subunits 55 and 58 are in vertically inverted relation to one another, and the shape obtained by rotating one of them by 180 degrees corresponds to the shape of the other one so that it is possible to produce the first and fourth subunits 55 and 58 by using the same die.

Figure 27:
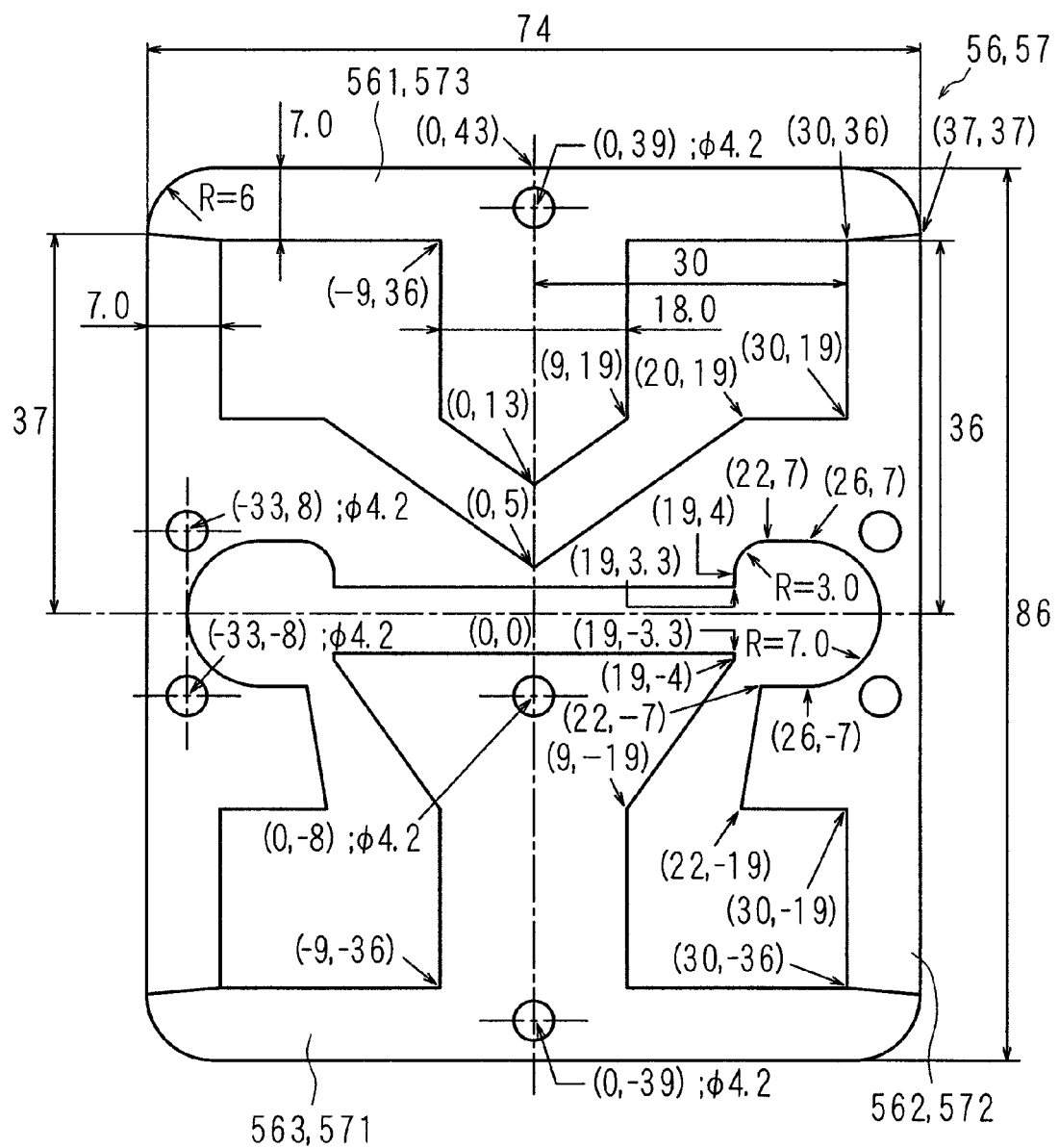
FIG. 27 is a plane view illustrating an armature part used for producing the armature according to Example 3.

In addition, after sixteen armature parts each having a plane shape as illustrated in FIG. 14B or 14C were cut out from the silicon steel sheet having a thickness of 0.5 mm using the wire cutting machine, and the cut-out sixteen armature parts were stacked and bonded together (thickness of 8 mm), the bonded parts were divided into three members to obtain three types of separated members in the second subunit 56 and the third subunit 57 (see FIGS. 17B and 17C). Examples of specific dimensions and shapes are illustrated in FIG. 27. (x, y) in FIG. 27 denotes the coordinate position of each point (unit of length: mm) when coordinates in the center are assumed to be (0, 0). As described above, the second and third subunits 56 and 57 are in vertically inverted relation to one another, and the shape obtained by rotating one of them by 180 degrees corresponds to the shape of the other one so that it is possible to produce the second and third subunits 56 and 57 by using the same die.

Figure 28:
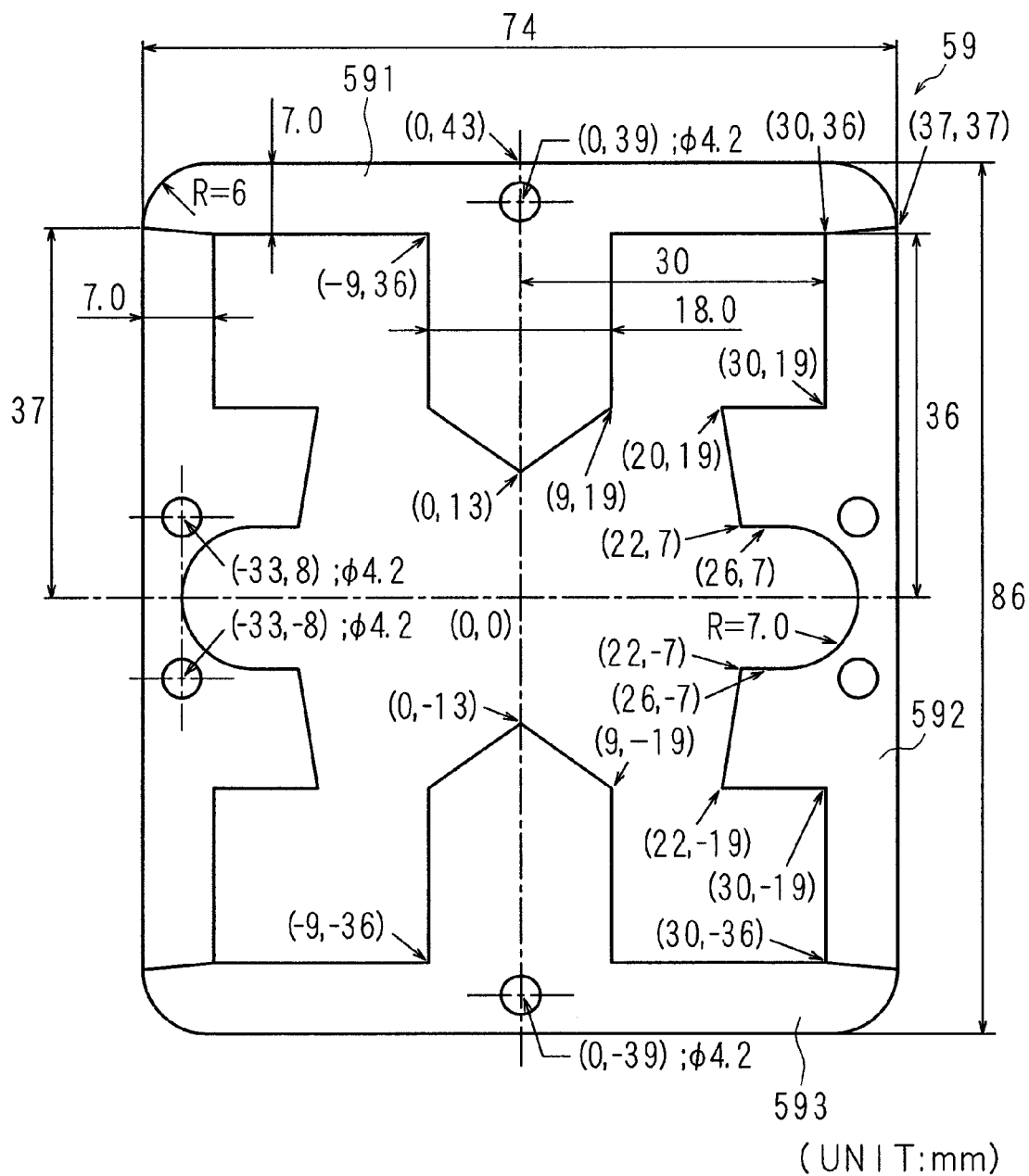
FIG. 28 is a plane view illustrating an armature part used for producing the armature according to Example 3.

Further, after eight armature parts each having a plane shape as illustrated in FIG. 14E were cut out from the silicon steel sheet having a thickness of 0.5 mm using the wire cutting machine, and the cut-out eight parts were stacked and bonded together (thickness of 4 mm), the bonded parts were divided into three members to obtain three types of separated members in the spacer unit 59 (see FIG. 17E). Examples of specific dimensions and shapes are illustrated in FIG. 28. (x, y) in FIG. 28 denotes the coordinate position of each point (unit of length: mm) when coordinates in the center are assumed to be (0, 0).

The first members of the individual units were stacked to constitute the first intermediate element 71 (see FIG. 18A), the second members of the individual units were stacked to constitute the second intermediate element 72 (see FIG. 18B), and the third members of the individual units were stacked to constitute the third intermediate element 73 (see FIG. 18C). The thickness of each of the first to third intermediate elements 71 to 73 is 44 mm (=8 mm×4+4 mm×3). The magnetic pole pitch thereof is 12 mm (=10 mm+2 mm).

As the winding 60a of the drive coil, the magnet wire having a diameter of 1.2 mm around which the polyimide tape for securing insulation was wound was collectively wound 100 turns around the core portions and the auxiliary core portions of the first intermediate element 71 and, as the winding 60b of the drive coil, the same magnet wire was collectively wound 100 turns around the core portions and the auxiliary core portions of the third intermediate element 73

(see FIGS. 19A and 19B). Subsequently, the series connection was performed such that directions of the current became opposite to each other when energization was performed. The first intermediate element 71, the second intermediate element 72, and the third intermediate element 73 were assembled to produce the armature 54 (see FIG. 15B).

Three of the thus-produced armatures 54 were prepared, the three armatures 54 were linearly arranged at the spacing of 28 mm (=12 mm×(2+⅓)), the mover 41 was inserted into the hollow portion in the center (see FIG. 16), and the armatures 54 were fixed to the test bench such that the mover 41 was movable in the longitudinal direction without contacting the armatures 54.

Figure 29:
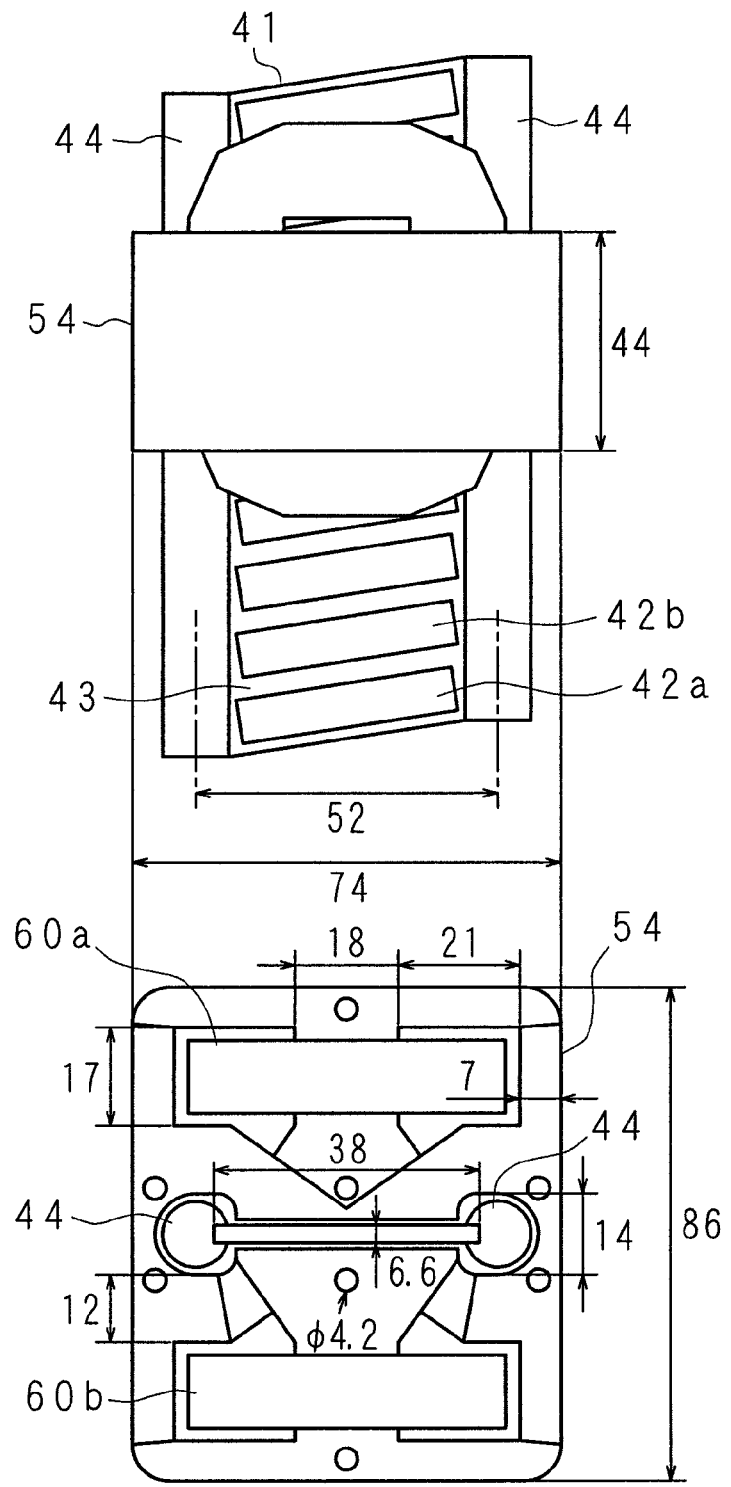
FIG. 29 includes a plane view and a cross-sectional view each illustrating a configuration of a linear motor according to Example 3.

Examples of dimensions and shapes of the portion for the single phase of the produced linear motor 70 are illustrated in FIG. 29. Since the dimension of the hollow portion of the armature 54 is 6.6 mm, and the thickness of each of the plate-like magnets 42a and 42b is 4.5 mm, the distance between the core of the armature 54 and the magnet of the mover 41 is 1.05 mm (=(6.6−4.5) mm÷2). In addition, in the armature 54, the distance between the drive coil and the core is 2 mm.

One ends of a pair of the drive coils that were wound around the three armatures 54 were connected with each other, and the other ends thereof were connected in star connection for connection with U, V, and W phases of the three-phase power source and connected with the motor controller. In addition, the optical linear scale was attached to the tip portion of the mover 41, and the linear encoder was attached on the side fixed to the test bench, whereby it became possible to read the position of the mover 41. Further, the configuration was adopted in which the positional signal detected by the linear encoder was outputted to the above-mentioned motor controller to control the position of the mover 41.

After the connections described above, the thrust force of the mover 41 was measured when the linear guide rails 44 were manually moved without applying the current. During the measurement, the thrust force was measured by the method in which the force gauge was pressed against the mover 41. The result of the measurement is illustrated in FIG. 30. The thrust force fluctuated only in a range of ±2.3 N in response to phase angles, and it was verified that the mover 41 was able to move smoothly.

Figure 31:
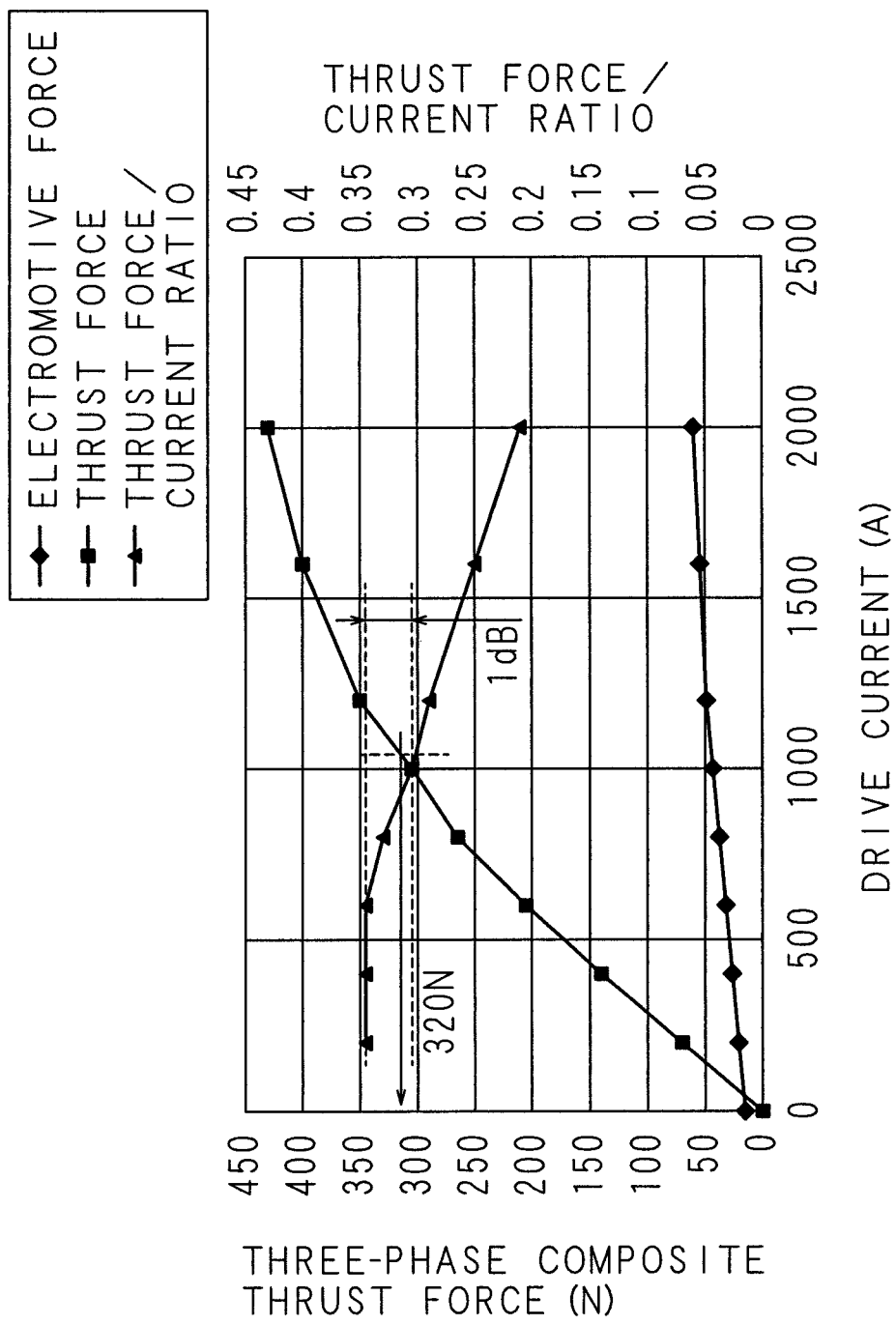
FIG. 31 is a graph illustrating a result of measurement of thrust force as a function of the total magnetomotive force in the linear motor according to Example 3.

Further, the thrust force of the mover 41 was measured while changing the drive current applied to the drive coils. During the measurement, the thrust force was measured by the method in which the force gauge was pressed against the mover 41. The result of the measurement is illustrated in FIG. 31. The horizontal axis in FIG. 31 denotes the rms value of the drive current×the number of turns of the coils per one phase of the armature. As illustrated in FIG. 31, the thrust force proportional to the drive current is obtained. The core is gradually saturated as the drive current is increased so that a thrust force/current ratio is reduced. However, in the example illustrated in FIG. 31, the percentage of reduction is kept lower than 1 dB (11%) up to the thrust force of 320 N.

In the mover in each of the first and second embodiments, by skewing the shape of the magnet with respect to the longitudinal direction of the mover, it is possible to reduce the cogging and realize the smooth high-speed linear movement.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An armature of a linear motor through which a plate-like mover is passed, comprising:
    a first subunit made of a soft magnetic material and having an opening portion through which the mover passes, a yoke portion disposed outside the opening portion, and a core portion extending from the yoke portion on one side in a thickness direction of the mover;
    a second subunit made of the soft magnetic material and having an opening portion through which the mover passes, a yoke portion disposed outside the opening portion, an auxiliary core portion extending from the yoke portion on one side in the thickness direction of the mover, and a core portion extending from the yoke portion on the other side in the thickness direction of the mover;
    a third subunit made of the soft magnetic material and having an opening portion through which the mover passes, a yoke portion disposed outside the opening portion, a core portion extending from the yoke portion on one side in the thickness direction of the mover, and an auxiliary core portion extending from the yoke portion on the other side in the thickness direction of the mover;
    a fourth subunit made of the soft magnetic material and having an opening portion through which the mover passes, a yoke portion disposed outside the opening portion, and a core portion extending from the yoke portion on the other side in the thickness direction of the mover; the first subunit, the second subunit, the third subunit and the fourth subunit being stacked in this order;
    a spacer unit made of the soft magnetic material and having an opening portion through which the mover passes, a yoke portion disposed outside the opening portion, and an auxiliary core portion extending from the yoke portion on either side in the thickness direction of the mover; the spacer unit provided between the first subunit and the second subunit, between the second subunit and the third subunit, and between the third subunit and the fourth subunit;
    a first winding collectively wound around the core portion of the first subunit, the auxiliary core portion of the second subunit, the core portion of the third subunit, and the auxiliary core portion on one side in the thickness direction of the mover of the spacer unit; and
    a second winding collectively wound around the core portion of the second subunit, the auxiliary core portion of the third subunit, the core portion of the fourth subunit, and the auxiliary core portion on the other side in the thickness direction of the mover of the spacer unit.

2. The armature of claim 1,
    wherein each of the first subunit, the second subunit, the third subunit, the fourth subunit, and the spacer unit is divided at an identical position in the thickness direction of the mover.

3. A linear motor, comprising:
    a mover in which each of a plurality of plate-like magnets magnetized in a thickness direction is disposed in each of a plurality of holes formed in parallel in a rectangular magnet holding spacer made of a non-magnetic material such that the plate-like magnet magnetized in one thickness direction and the plate-like magnet magnetized in a direction opposite to the one thickness direction are alternately arranged, and a linear guide rail is provided on a frame extending in a longitudinal direction on either side in a width direction of the magnet holding spacer; and an armature in which a first subunit made of a soft magnetic material and having a rectangular opening portion, a yoke portion disposed outside the opening portion, and a core portion extending from the yoke portion on one side in a thickness direction of the mover, a second subunit made of a soft magnetic material and having a rectangular opening portion, a yoke portion disposed outside the opening portion, an auxiliary core portion extending from the yoke portion on one side in the thickness direction of the mover, and a core portion provided to extend from the yoke portion on the other side in the thickness direction of a mover, a third subunit made of a soft magnetic material and having a rectangular opening portion, a yoke portion disposed outside the opening portion, a core portion extending from the yoke portion on one side in the thickness direction of the mover, and an auxiliary core portion extending from the yoke portion on the other side in the thickness direction of the mover, and a fourth subunit made of the soft magnetic material and having a rectangular opening portion, a yoke portion disposed outside the opening portion, and a core portion extending from the yoke portion on the other side in the thickness direction of the mover are stacked in this order, a spacer unit made of the soft magnetic material and having a rectangular opening portion, a yoke portion disposed outside the opening portion, and an auxiliary core portion extending from the yoke portion on either side in the thickness direction of the mover between the first subunit and the second subunit, between the second subunit and the third subunit, and between the third subunit and the fourth subunit, a first winding collectively wound around the core portion of the first subunit, the auxiliary core portion of the second subunit, the core portion of the third subunit, and the auxiliary core portion on one side in the thickness direction of the mover of the spacer unit, and a second winding collectively wound around the core portion of the second subunit, the auxiliary core portion of the third subunit, the core portion of the fourth subunit, and the auxiliary core portion on the other side in the thickness direction of the mover of the spacer unit; wherein the mover passes through the opening portion of the first subunit, the opening portion of the second subunit, the opening portion of the third subunit, the opening portion of the fourth subunit, and the opening portion of the spacer unit of the armature.

* * * * *